US012033558B2

(12) United States Patent
Ko et al.

(10) Patent No.: US 12,033,558 B2
(45) Date of Patent: Jul. 9, 2024

(54) DISPLAY DEVICE

(71) Applicant: Samsung Display Co., Ltd., Yongin-si (KR)

(72) Inventors: Junhan Ko, Seoul (KR); Byunghyuk Shin, Seoul (KR); Ikhyun Ahn, Seongnam-si (KR); Kyungsu Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/721,719

(22) Filed: Apr. 15, 2022

(65) Prior Publication Data

US 2022/0398963 A1   Dec. 15, 2022

(30) Foreign Application Priority Data

Jun. 11, 2021   (KR) .......................... 10-2021-0076006

(51) Int. Cl.
*G09G 3/20*   (2006.01)

(52) U.S. Cl.
CPC ......... *G09G 3/2007* (2013.01); *G09G 3/2092* (2013.01); *G09G 2320/0613* (2013.01); *G09G 2320/0686* (2013.01); *G09G 2330/021* (2013.01)

(58) Field of Classification Search
CPC .............. G09G 3/2007; G09G 3/2092; G09G 2320/0613; G09G 2320/0686; G09G 2330/021
USPC ........................................................ 345/694
See application file for complete search history.

(56) References Cited

U.S. PATENT DOCUMENTS

| 7,242,379 B2 | 7/2007 | Yamazaki |
| 10,332,432 B2 | 6/2019 | An et al. |
| 10,719,127 B1 | 7/2020 | Keith |
| 2011/0047368 A1* | 2/2011 | Sundaramurthy .. G06F 3/04883 713/100 |
| 2013/0271454 A1* | 10/2013 | Lyons ..................... G06T 11/60 345/619 |
| 2018/0136719 A1* | 5/2018 | Chen ....................... G06F 3/013 |

(Continued)

FOREIGN PATENT DOCUMENTS

| KR | 100658632 B1 | 12/2006 |
| KR | 101754750 B1 | 7/2017 |

(Continued)

OTHER PUBLICATIONS

Extended European Search Report for Application No. 22178354. 1-1207 dated Nov. 7, 2022.

*Primary Examiner* — Amare Mengistu
*Assistant Examiner* — Gloryvid Figueroa-Gibson
(74) *Attorney, Agent, or Firm* — CANTOR COLBURN LLP

(57) ABSTRACT

A display device includes a display panel which displays an image, and a panel driving block which receives a control signal and generating a criterion point signal including information about a criterion point for adjusting luminance of the image based on the control signal. The panel driving block receives image signals, generates a correction value based on distance information about a location of the display panel, at which each of the image signals is displayed, and the criterion point, and generates correction image signals by converting the image signals based on the correction value.

31 Claims, 20 Drawing Sheets

(56) References Cited

U.S. PATENT DOCUMENTS

2020/0394830 A1 12/2020 Choubey et al.
2021/0166341 A1* 6/2021 Bastani .................. G06T 11/00

FOREIGN PATENT DOCUMENTS

| KR | 1020190020633 A | 3/2019 |
| KR | 1020200001709 A | 1/2020 |
| KR | 102120424 B1 | 6/2020 |

* cited by examiner

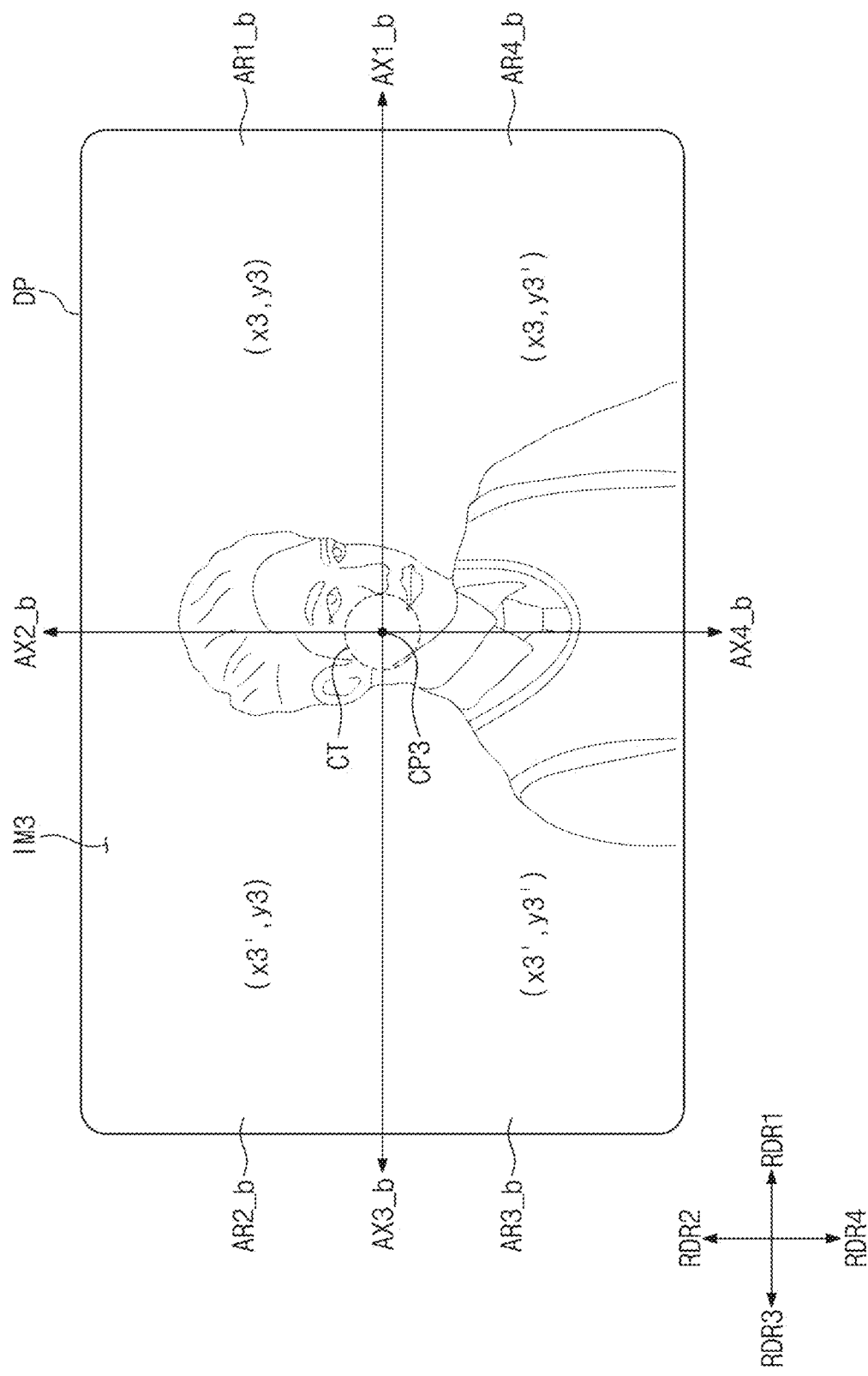

DISPLAY DEVICE

This application claims priority to Korean Patent Application No. 10-2021-0076006, filed on Jun. 11, 2021, and all the benefits accruing therefrom under 35 U.S.C. § 119, the content of which in its entirety is herein incorporated by reference.

BACKGROUND

1. Field

Embodiments of the disclosure described herein relate to a display device, and more particularly, relate to a display device capable of reducing power consumption.

2. Description of the Related Art

Various types of display devices are being used in various fields to provide image information. In particular, an organic light-emitting display ("OLED") device, a quantum dot display device, a liquid crystal display ("LCD") device, a plasma display device, etc. are being used as a display device.

The display device typically includes a display panel that displays an image and a panel driving block that is coupled to the display panel to provide a driving signal to the display panel. The display panel includes light-emitting elements that generate a light. The organic light-emitting display device includes an organic light-emitting element generating a light.

SUMMARY

Embodiments of the disclosure provide a display device capable of reducing power consumption.

According to an embodiment, a display device includes a display panel which displays an image, and a panel driving block which receives a control signal, and generates a criterion point signal including information about a criterion point for adjusting luminance of the image based on the control signal. In such an embodiment, the panel driving block receives image signals, and generates a correction value based on distance information between the criterion point and a location of the display panel, at which each of the image signals is displayed. In such an embodiment, the panel driving block generates correction image signals by converting the image signals based on the correction value.

In an embodiment of the disclosure, a grayscale corresponding to the correction image signals may be smaller than a grayscale corresponding to the image signals.

In an embodiment of the disclosure, a location of the criterion point on the display panel may change based on a type of the image to be displayed at the display panel.

In an embodiment of the disclosure, the display panel may include a plurality of areas divided with respect to the criterion point. In such an embodiment, the panel driving block may generate a weight for each of the areas based on the control signal, and generate the correction value based on the distance information and the weight.

In an embodiment of the disclosure, the areas may include a first area corresponding to a first quadrant defined by a first axis extending from the criterion point in a first reference direction and a second axis extending from the criterion point in a second reference direction, a second area corresponding to a second quadrant defined by a third axis extending from the criterion point in a third reference direction away from the first reference direction and the second axis, a third area corresponding to a third quadrant defined by a fourth axis extending from the criterion point in a fourth reference direction away from the second reference direction and the third axis, and a fourth area corresponding to a fourth quadrant defined by the first axis and the fourth axis. In such an embodiment, the weight may include a first weight corresponding to the first area, a second weight corresponding to the second area, a third weight corresponding to the third area, and a fourth weight corresponding to the fourth area.

In an embodiment of the disclosure, the first to fourth weights may have different values from each other.

In an embodiment of the disclosure, the areas may include a first area including the criterion point, and a second area surrounding the first area. In such an embodiment, the weight may include a first weight corresponding to the first area, and a second weight corresponding to the second area.

In an embodiment of the disclosure, the first weight and the second weight may have different values from each other.

In an embodiment of the disclosure, the panel driving block may include a controller which generates the correction image signals by converting the image signals based on the correction value and generates image data based on the correction image signals, and a source driver which generates a data signal based on the image data and transmits the data signal to the display panel.

In an embodiment of the disclosure, the panel driving block may further include an extracting part which generates the criterion point signal based on the control signal.

In an embodiment of the disclosure, the controller includes a distance calculating part which extracts the distance information for each of the image signals, a correction value calculating part which generates the correction value based on the distance information, and a correcting part which generates the correction image signals by converting the image signals based on the correction value.

In an embodiment of the disclosure, the display panel may include a plurality of areas divided with respect to the criterion point. In such an embodiment, the extracting part may further generate a weight for each of the areas based on the control signal.

In an embodiment of the disclosure, the correction value calculating part may generate the correction value based on the distance information and the weight.

In an embodiment of the disclosure, the controller may include an extracting part which generates the criterion point signal based on the control signal.

In an embodiment of the disclosure, the display panel may include a plurality of areas divided with respect to the criterion point. In such an embodiment, the extracting part may further generates a weight for each of the areas based on the control signal.

In an embodiment of the disclosure, the display panel may include a plurality of areas divided with respect to the criterion point. In such an embodiment, the panel driving block may further receive a setting signal including a weight for each of the areas and generate the correction value based on the distance information and the weight.

In an embodiment of the disclosure, a magnitude of the weight may be determined by an external input.

In an embodiment of the disclosure, a settings application capable of adjusting the magnitude of the weight may be displayed at the display panel. In such an embodiment, the magnitude of the weight may be determined by the external input selecting the magnitude of the weight in the settings application.

According to an embodiment of the disclosure, a display device includes a display panel which displays an image, and a panel driving block which receives image signals and calculates distance information between a criterion point for adjusting luminance of the image and a location of the display panel, at which each of the image signals is displayed. In such an embodiment, the display panel includes a plurality of areas divided with respect to the criterion point. In such an embodiment, the panel driving block receives a setting signal including a weight for each of the areas, generates a correction value based on the distance information and the setting signal, and generates correction image signals by converting the image signals based on the correction value.

In an embodiment of the disclosure, a grayscale corresponding to the correction image signals may be smaller than a grayscale corresponding to the image signals.

In an embodiment of the disclosure, a magnitude of the weight included in the setting signal may be determined by an external input.

In an embodiment of the disclosure, a settings application capable of adjusting the magnitude of the weight may be displayed at the display panel. In such an embodiment, the magnitude of the weight may be determined by the external input selecting the magnitude of the weight in the settings application.

In an embodiment of the disclosure, the panel driving block may further receive a control signal and generate a criterion point signal including information about the criterion point based on the control signal.

According to an embodiment of the disclosure, a display device a display panel which displays an image, and a panel driving block which drives the display panel in a first mode or in a second mode, in response to a state signal. In such an embodiment, in the first mode, the panel driving block drives the display panel based on image signals. In such an embodiment, in the second mode, the panel driving block generates a first correction value based on distance information between a criterion point for adjusting luminance of the image and a location of the display panel, at which each of the image signals is displayed. In such an embodiment, in the second mode, the panel driving block drives the display panel based on first correction image signals generated by converting the image signals based on the first correction value.

In an embodiment of the disclosure, a grayscale corresponding to the first correction image signals may be smaller than a grayscale corresponding to the image signals.

In an embodiment of the disclosure, the state signal may change based on an external input which a user provides to the display device. In such an embodiment, the panel driving block may operate in the first mode when the user provides the external input to the display device, and operate in the second mode when the user does not provide the external input to the display device.

In an embodiment of the disclosure, in the second mode, the panel driving block may drive the display panel based on second correction image signals generated by converting the first correction image signals based on a second correction value such that a grayscale of the image to be displayed at the display panel is decreased.

In an embodiment of the disclosure, the panel driving block may drive the display panel based on the first correction image signals when a user does not provide an external input to the display device during a first time. In such an embodiment, the panel driving block may drive the display panel based on the second correction image signals when the user does not provide the external input to the display device during a second time longer than the first time.

In an embodiment of the disclosure, the panel driving block may receive a control signal and may generate a criterion point signal including information about the criterion point based on the control signal.

In an embodiment of the disclosure, the display panel may include a plurality of areas divided with respect to the criterion point. In such an embodiment, the panel driving block may generate a weight for each of the areas based on the control signal; and may generate the first correction value based on the distance information and the weight.

In an embodiment of the disclosure, the display panel may include a plurality of areas divided with respect to the criterion point. In such an embodiment, the panel driving block may further receive a setting signal including a weight for each of the areas and may generate the first correction value based on the distance information and the weight.

BRIEF DESCRIPTION OF THE DRAWINGS

The above and other features of the disclosure will become apparent by describing in detail embodiments thereof with reference to the accompanying drawings.

FIGS. 5A to 5C are conceptual diagrams for describing a criterion point and a weight varying depending on a kind of an image, according to embodiments of the disclosure.

DETAILED DESCRIPTION

Figure 1:
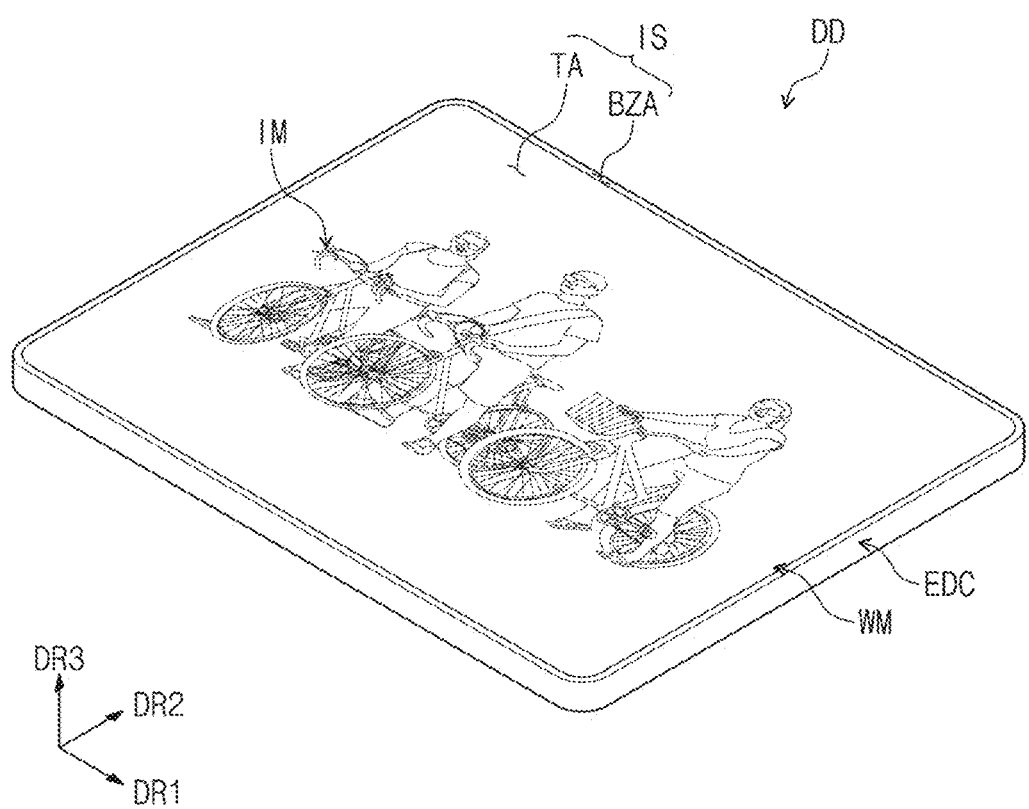
FIG. 1 is a perspective view of a display device, according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

In the specification, the expression that a first component (or region, layer, part, portion, etc.) is "on", "connected with", or "coupled with" a second component means that the first component is directly on, connected with, or coupled with the second component or means that a third component is interposed therebetween.

Although the terms "first", "second", etc. may be used to describe various components, the components should not be construed as being limited by the terms. The terms are only used to distinguish one component from another component. For example, without departing from the scope and spirit of the invention, a first component may be referred to as a second component, and similarly, the second component may be referred to as the second component. The articles "a", "an", and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical terms and scientific terms) used in the specification have the same meaning as commonly understood by one skilled in the art to which the disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the disclosure will be described in detail with reference to the accompanying drawings.

Figure 2:
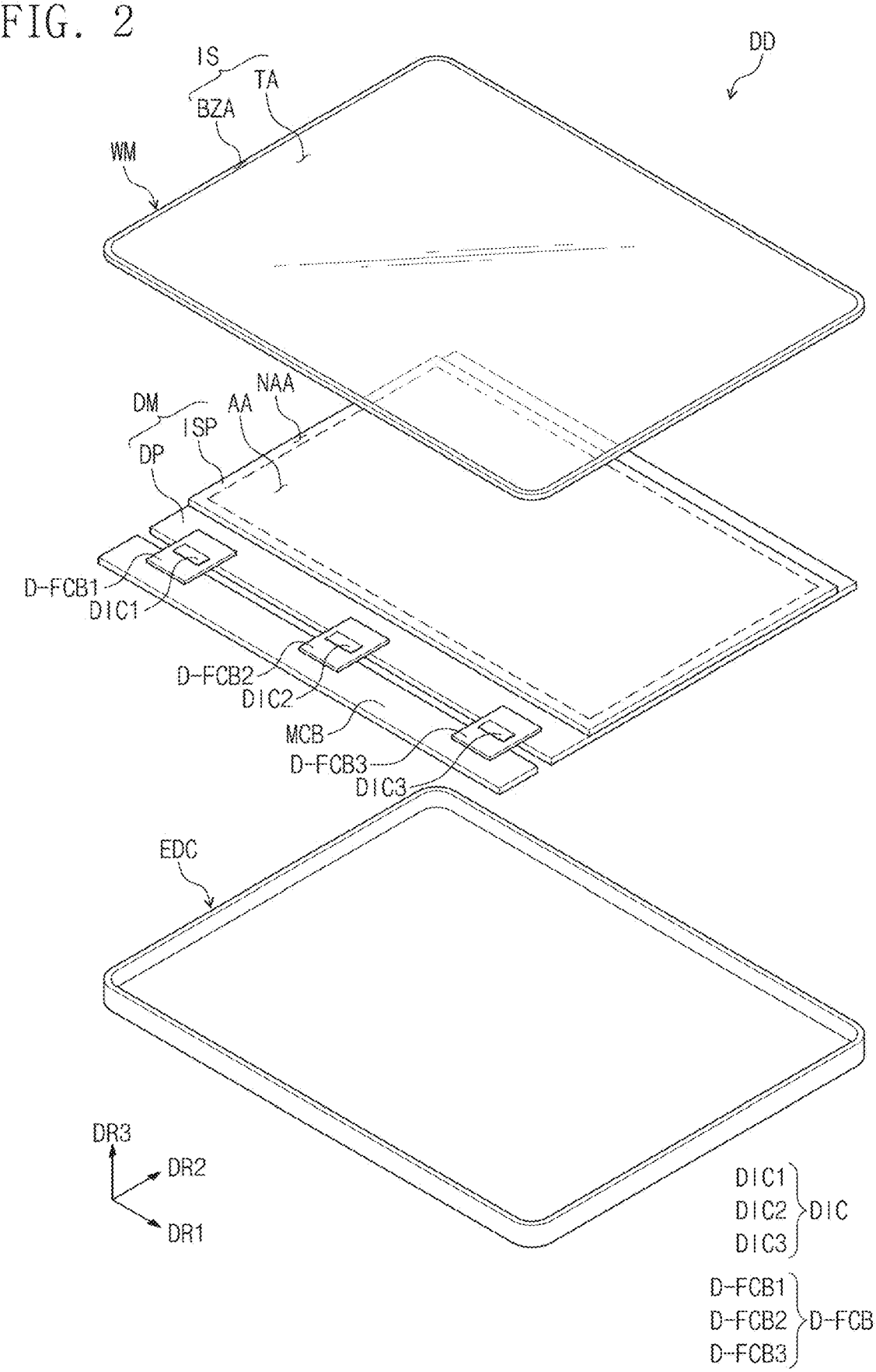
FIG. 2 is an exploded perspective view of a display device illustrated in FIG. 1.

FIG. 1 is a perspective view of a display device, according to an embodiment of the disclosure. FIG. 2 is an exploded perspective view of a display device illustrated in FIG. 1.

Referring to FIGS. 1 and 2, an embodiment of a display device DD may be a device that is activated based on an electrical signal. In an embodiment, the display device DD may be a small and medium-sized electronic device, such as a mobile phone, a tablet, a vehicle navigation system, or a game console, as well as a large-sized electronic device, such as a television or a monitor, for example. Alternatively, the display device DD may be applied to any other electronic device(s) without departing from the concept of the disclosure.

The display device DD is in the shape of a rectangle having a long edge in a first direction DR1 and a short edge in a second direction DR2 intersecting the first direction DR1. However, the shape of the display device DD is not limited thereto. In an embodiment, for example, the display device DD may be implemented in various shapes. The display device DD may display an image IM on a display surface IS parallel to each of the first direction DR1 and the second direction DR2, so as to face a third direction DR3. The display surface IS on which the image IM is displayed may correspond to a front surface of the display device DD.

In an embodiment, a front surface (or an upper/top surface) and a rear surface (or a lower/bottom surface) of each member are defined with respect to a direction in which the image IM is displayed. The front surface and the rear surface may be opposite to each other in the third direction DR3, and a normal direction of each of the front surface and the rear surface may be parallel to the third direction DR3.

A separation distance between the front surface and the rear surface in the third direction DR3 may correspond to a thickness of the display device DD in the third direction DR3. Herein, directions that the first, second, and third directions DR1, DR2, and DR3 indicate may be relative in concept and may be changed to different directions.

In an embodiment, the display device DD may sense an external input applied from the outside. The external input may include various types of inputs that are provided from the outside of the display device DD. In an embodiment, the display device DD may sense an external input of a user US (refer to FIG. 11A), which is applied from the outside. The external input of the user US may be one of various types of external inputs, such as a part of the user's body, light, heat, an eye of the user, and pressure, or a combination thereof. In an embodiment, the display device DD may sense the external input of the user US applied to a side surface or a rear surface of the display device DD depending on a structure of the display device DD, but not being limited thereto. In an embodiment of the disclosure, an external input may include an input by an input device (e.g., a stylus pen, an active pen, a touch pen, an electronic pen, or an E-pen).

The front surface of the display device DD may be divided into a transparent area TA and a bezel area BZA. The transparent area TA may be an area in which the image IM is displayed. The user US perceives the image IM through the transparent area TA. In an embodiment, the transparent area TA may be in the shape of a quadrangle whose vertexes are rounded, for example. Alternatively, the transparent area TA may have various shapes, but not being limited to any one embodiment.

The bezel area BZA is adjacent to the transparent area TA. The bezel area BZA may have a given or predetermined color. The bezel area BZA surrounds the transparent area TA. In an embodiment, a shape of the transparent area TA may be defined substantially by the bezel area BZA, for example. Alternatively, the bezel area BZA may be disposed adjacent to only one side of the transparent area TA or may be omitted. The bezel area BZA of the display device DD may be variously modified and is not limited to any one embodiment.

In an embodiment, as illustrated in FIG. 2, the display device DD may include a display module DM and a window WM disposed on the display module DM. The display module DM includes a display panel DP and an input sensing layer ISP.

In an embodiment, the display panel DP may be a light-emitting display panel. The display panel DP may be, for example, an organic light-emitting display panel, an inorganic light-emitting display panel, or a quantum dot light-emitting display panel. An emission layer of the organic light-emitting display panel may include an organic light-emitting material. An emission layer of the inorganic light-emitting display panel may include an inorganic light-emitting material. An emission layer of the quantum dot light-emitting display panel may include a quantum dot, a quantum rod, etc. Hereinafter, for convenience of description, embodiments where the display panel DP is an organic light-emitting display panel will be described in detail.

The display panel DP may output the image IM, and the output image IM may be displayed through the display surface IS.

The input sensing layer ISP may be disposed on the display panel DP to sense an external input. The input sensing layer ISP may be disposed directly on the display panel DP. According to an embodiment of the disclosure, the input sensing layer ISP may be formed on the display panel DP by a continuous process. In such an embodiment, where the input sensing layer ISP is disposed directly on the display panel DP, an inner adhesive film (not illustrated) is not interposed between the input sensing layer ISP and the display panel DP. In an alternative embodiment, an inner adhesive film may be interposed between the input sensing layer ISP and the display panel DP. In such an embodiment, the input sensing layer ISP is not manufactured by a process continuous to that of the display panel DP. In such an embodiment, the input sensing layer ISP may be manufactured through a process separate from that of the display panel DP and may then be fixed on an upper surface of the display panel DP by the inner adhesive film.

The window WM may include or be formed of a transparent material capable of outputting the image IM. In an embodiment, for example, the window WM may include or be formed of glass, sapphire, plastic, etc. In an embodiment, the window WM may be implemented with a single layer, but the disclosure is not limited thereto. In one alternative embodiment, for example, the window WM may include a plurality of layers.

in an embodiment, although not illustrated in drawings, the bezel area BZA of the display device DD described above may correspond to an area that is defined by printing a material including a given color on one area of the window WM. In an embodiment of the disclosure, the window WM may include a light blocking pattern for defining the bezel area BZA. The light blocking pattern that is a colored organic film may be formed, for example, in a coating manner.

The window WM may be coupled to the display module DM through an adhesive film. In an embodiment of the disclosure, the adhesive film may include an optically clear adhesive ("OCA") film. However, the adhesive film is not limited thereto. In an embodiment, for example, the adhesive film may include a typical adhesive or sticking agent. In an embodiment, for example, the adhesive film may include an optically clear resin ("OCR") film or a pressure sensitive adhesive ("PSA") film.

An anti-reflection layer may be further disposed between the window WM and the display module DM. The anti-reflection layer decreases reflectivity of an external light incident from above the window WM. In an embodiment, the anti-reflection layer may include a retarder and a polarizer. The retarder may be a retarder of a film type or a liquid crystal coating type and may include a $\lambda/2$ retarder and/or a $\lambda/4$ retarder. The polarizer may also be a polarizer of a film type or a liquid crystal coating type. The film type may include a stretch-type synthetic resin film, and the liquid crystal coating type may include liquid crystals arranged in a given direction. The retarder and the polarizer may be implemented with or collectively define one polarization film.

In an embodiment of the disclosure, the anti-reflection layer may also include color filters. An array of color filters may be determined in consideration of colors of lights that a plurality of pixels PX (refer to FIG. 3) included in the display panel DP generate. In an embodiment, the anti-reflection layer may further include a light blocking pattern.

The display module DM may display an image based on an electrical signal and may transmit/receive information about an external input. The display module DM may be defined by an active area AA and an inactive area NAA. The active area AA may be defined as an area through which an image provided from the display module DM is output. In an embodiment, the active area AA may be defined as an area in which the input sensing layer ISP senses an external input applied from the outside.

The inactive area NAA is adjacent to the active area AA. In an embodiment, for example, the inactive area NAA may surround the active area AA, for example. Alternatively, The inactive area NAA may be defined in various shapes, but not being limited to any one embodiment. According to an embodiment, the active area AA of the display module DM may correspond to at least a portion of the transparent area TA.

The display module DM may further include a main circuit board MCB, a plurality of flexible circuit films D-FCB and a plurality of driver chips DIC. The main circuit board MCB may be connected with the flexible circuit films D-FCB to be electrically connected with the display panel DP. The flexible circuit films D-FCB may be connected with the display panel DP such that the display panel DP and the main circuit board MCB are electrically connected. The main circuit board MCB may include a plurality of driver devices. The plurality of driver devices may include a circuit part for driving the display panel DP. The driver chips DIC may be mounted on the flexible circuit films D-FCB.

In an embodiment of the disclosure, the flexible circuit films D-FCB may include a first flexible circuit film D-FCB1, a second flexible circuit film D-FCB2, and a third flexible circuit film D-FCB3. The driver chips DIC may include a first driver chip DIC1, a second driver chip DIC2, and a third driver chip DIC3. The first to third flexible circuit films D-FCB1, D-FCB2, and D-FCB3 may be disposed to be spaced from each other in the first direction DR1 and may be connected with the display panel DP to electrically connect the display panel DP and the main circuit board MCB. The first driver chip DIC1 may be mounted on the first flexible circuit film D-FCB1. The second driver chip DIC2 may be mounted on the second flexible circuit film D-FCB2. The third driver chip DIC3 may be mounted on the third flexible circuit film D-FCB3. However, an embodiment of the disclosure is not limited thereto. In an embodiment, for example, the display panel DP may be electrically connected with the main circuit board MCB through a single flexible circuit film, and only a single driver chip may be mounted on the single flexible circuit film. In an alternative embodiment, the display panel DP may be electrically connected with the main circuit board MCB through four or more flexible circuit films, and driver chips may be respectively mounted on the flexible circuit films.

An embodiment may have a structure in which the first to third driver chips DIC1, DIC2, and DIC3 are respectively mounted on the first to third flexible circuit films D-FCB1, D-FCB2, and D-FCB3 as illustrated in FIG. 2, but the disclosure is not limited thereto. In one alternative embodiment, for example, the first to third driver chips DIC1, DIC2, and DIC3 may be directly mounted on the display panel DP. In such an embodiment, a portion of the display panel DP, on which the first to third driver chips DIC1, DIC2, and DIC3 are mounted, may be bent such that the first to third driver chips DIC1, DIC2, and DIC3 are disposed on a rear surface of the display module DM. In an embodiment, the first to third driver chips DIC1, DIC2, and DIC3 may be directly mounted on the main circuit board MCB.

In an embodiment, the input sensing layer ISP may be electrically connected with the main circuit board MCB through the flexible circuit films D-FCB. However, an embodiment of the disclosure is not limited thereto. Alternatively, the display module DM may additionally include a separate flexible circuit film for electrically connecting the input sensing layer ISP and the main circuit board MCB.

The display device DD further includes an outer case EDC accommodating the display module DM. The outer case EDC may be coupled with the window WM to define the exterior of the display device DD. The outer case EDC may absorb external shocks and may prevent a foreign material/moisture or the like from being infiltrated into the display module DM such that components accommodated in the outer case EDC are protected. In an embodiment of the disclosure, the outer case EDC may be provided in the form of a combination of a plurality of accommodating members.

In an embodiment, the display device DD may further include an electronic module including various functional modules for operating the display module DM, a power supply module for supplying a power necessary for overall operations of the display device DD, a bracket coupled with the display module DM and/or the outer case EDC to partition an inner space of the display device DD, etc. In an embodiment of the disclosure, the electronic module may include a control module that controls overall operations of the display device DD. The control module may include a graphic processing unit ("GPU") that generates a signal for displaying various kinds of information by using a graphic or a text.

Figure 3:
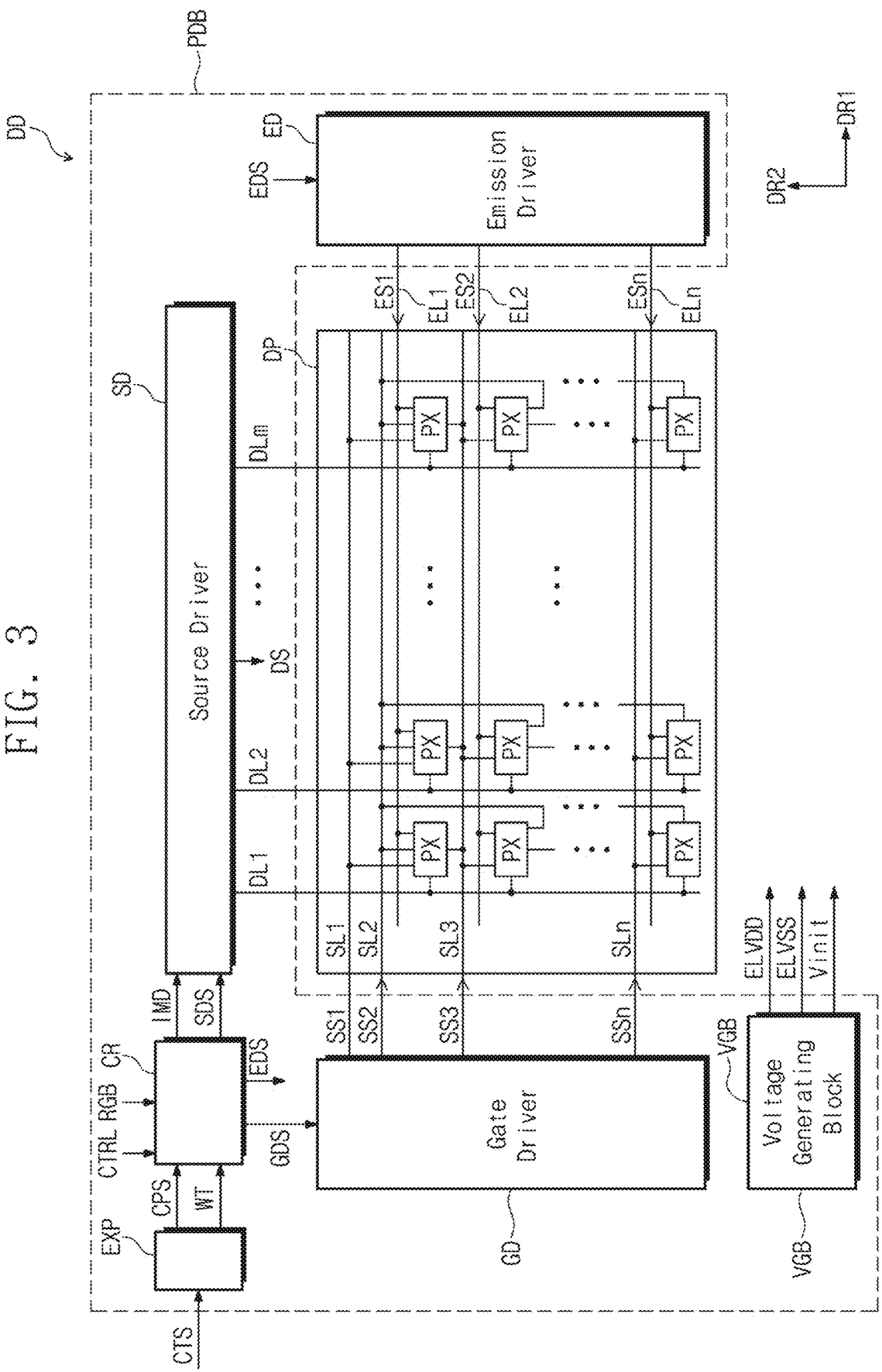
FIG. 3 is a block diagram of a display device, according to an embodiment of the disclosure.

FIG. 3 is a block diagram of a display device, according to an embodiment of the disclosure.

Referring to FIG. 3, an embodiment of the display device DD includes the display panel DP and a panel driving block PDB. The panel driving block PDB controls the driving of the display panel DP.

In an embodiment of the disclosure, the panel driving block PDB includes a controller CR, a source driver SD, a gate driver GD, an emission driver ED, and a voltage generating block VGB.

The controller CR receives an image signal RGB and an external control signal CTRL from an outside. The controller CR generates image data IMD by converting a data format of the image signal RGB in compliance with the specification for an interface with the source driver SD. The controller CR generates a source driving signal SDS, a gate driving signal GDS, and an emission control signal EDS based on the external control signal CTRL. The external control signal CTRL may include a vertical synchronization signal, a horizontal synchronization signal, a main clock, etc.

The controller CR provides the image data IMD and the source driving signal SDS to the source driver SD. The source driving signal SDS may include a horizontal start signal allowing an operation of the source driver SD to start. In response to the source driving signal SDS, the source driver SD generates a data signal DS based on the image data IMD. The source driver SD outputs the data signal DS to a plurality of data lines DL1 to DLm to be described later. The data signal DS may refer to an analog voltage corresponding to a grayscale value of the image data IMD.

The controller CR transmits the gate driving signal GDS to the gate driver GD. The gate driving signal GDS may include a vertical start signal for starting an operation of the gate driver GD, a scan clock signal for determining output timing of scan signals SS1 to SSn, etc. The gate driver GD generates the scan signals SS1 to SSn based on the gate driving signal GDS. The gate driver GD outputs the scan signals SS1 to SSn to a plurality of scan lines SL1 to SLn to be described later.

The controller CR transmits the emission control signal EDS to the emission driver ED. The emission driver ED outputs emission control signals ES1 to ESn to a plurality of emission lines EL1 to ELn in response to the emission control signal EDS.

The voltage generating block VGB generates voltages used for an operation of the display panel DP. In an embodiment of the disclosure, the voltage generating block VGB generates a first driving voltage ELVDD, a second driving voltage ELVSS, and an initialization voltage Vinit. In an embodiment of the disclosure, the voltage generating block VGB may operate under control of the controller CR. In an embodiment of the disclosure, a voltage level of the first driving voltage ELVDD is greater than a voltage level of the second driving voltage ELVSS. In an embodiment of the disclosure, the voltage level of the first driving voltage ELVDD may be in a range of about 20 volts (V) to about 30 V. A voltage level of the initialization voltage Vinit is smaller than the voltage level of the second driving voltage ELVSS. In an embodiment of the disclosure, the voltage level of the initialization voltage Vinit may be in a range of about 1 V to about 9 V.

In an embodiment of the disclosure, the display panel DP includes the plurality of scan lines SL1 to SLn, the plurality of data lines DL1 to DLm, the plurality of emission lines EL1 to ELn, and the plurality of pixels PX.

The scan lines SL1 to SLn extend from the gate driver GD in the first direction DR1 and are arranged to be spaced from each other in the second direction DR2. The data lines DL1 to DLm extend from the source driver SD in a direction away from the second direction DR2 and are arranged to be spaced from each other in the first direction DR1.

Each of the pixels PX is electrically connected with three corresponding scan lines among the scan lines SL1 to SLn. Also, each of the pixels PX is electrically connected with one corresponding emission line among the emission lines EL1 to ELn and one corresponding data line among the data lines DL1 to DLm. In an embodiment, for example, as illustrated in FIG. 3, a first row of pixels may be connected with the first to third scan lines SL1, SL2, and SL3, the first emission line EL1, and the first data line DL1. However, a connection relationship between the pixels PX and the scan lines SL1 to SLn, the data lines DL1 to DLm, and the emission lines EL1 to ELn may be variously modified based on a configuration of a driver circuit of the pixels PX.

Each of the pixels PX includes a light-emitting diode and a pixel circuit part for controlling an emission operation of the light-emitting diode. The pixel circuit part may include a plurality of transistors and a capacitor. Each of the pixels PX receives the first driving voltage ELVDD, the second driving voltage ELVSS, and the initialization voltage Vinit.

Each of the pixels PX may include a light-emitting diode generating a color light. In an embodiment, for example, the pixels PX may include red pixels that emits a red color light, green pixels that emits a green color light, and blue pixels that emits a blue color light. A light-emitting diode of a red pixel, a light-emitting diode of a green pixel, and a light-emitting diode of a blue pixel may include emission layers of different materials.

The panel driving block PDB may receive a control signal CTS and may generate a criterion point signal CPS including information about a criterion point for adjusting luminance of the image IM (refer to FIG. 1), based on the control signal CTS. In an embodiment of the disclosure, the panel driving block PDB may further generate a weight WT based on the control signal CTS. The criterion point signal CPS and the weight WT will be described later in greater detail with reference to FIGS. 4A to 6B. In an embodiment of the disclosure, the panel driving block PDB may further include an extracting part EXP. The extracting part EXP may generate the criterion point signal CPS and the weight WT based on the control signal CTS. In an embodiment, as illustrated in FIG. 3, the extracting part EXP may be provided as a component independent of the controller CR. Alternatively, the extracting part EXP may be included in the controller CR.

The controller CR may generate a correction image signal RGB' (refer to FIG. 4A) by converting the image signals RGB based on the criterion point signal CPS and the weight WT and may generate the image data IMD based on the correction image signal RGB'.

Figure 4A:
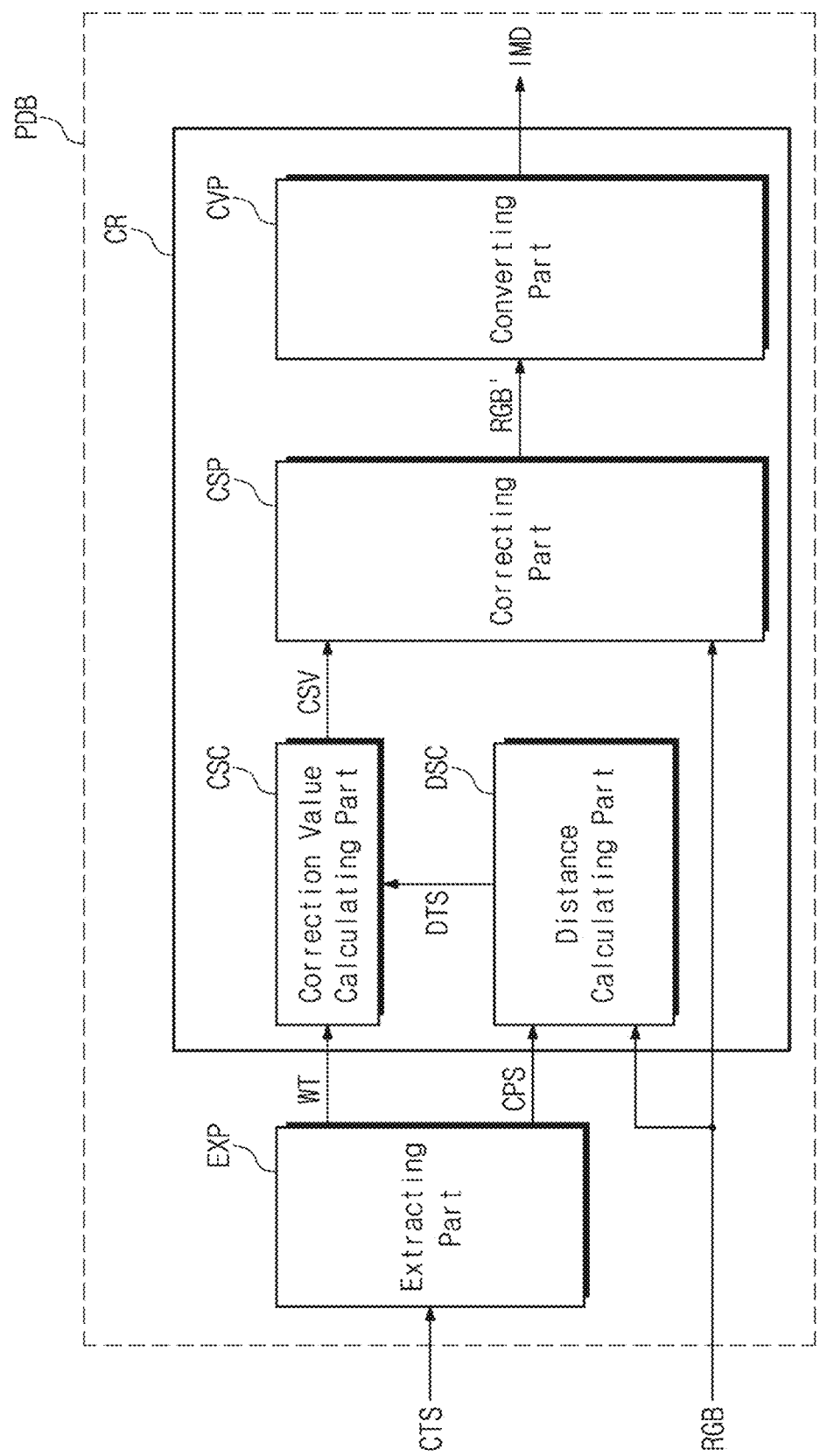
FIGS. 4A and 4B are block diagrams for describing how an extracting part and a controller operate depending on a control signal, according to embodiments of the disclosure.
Figure 4B:
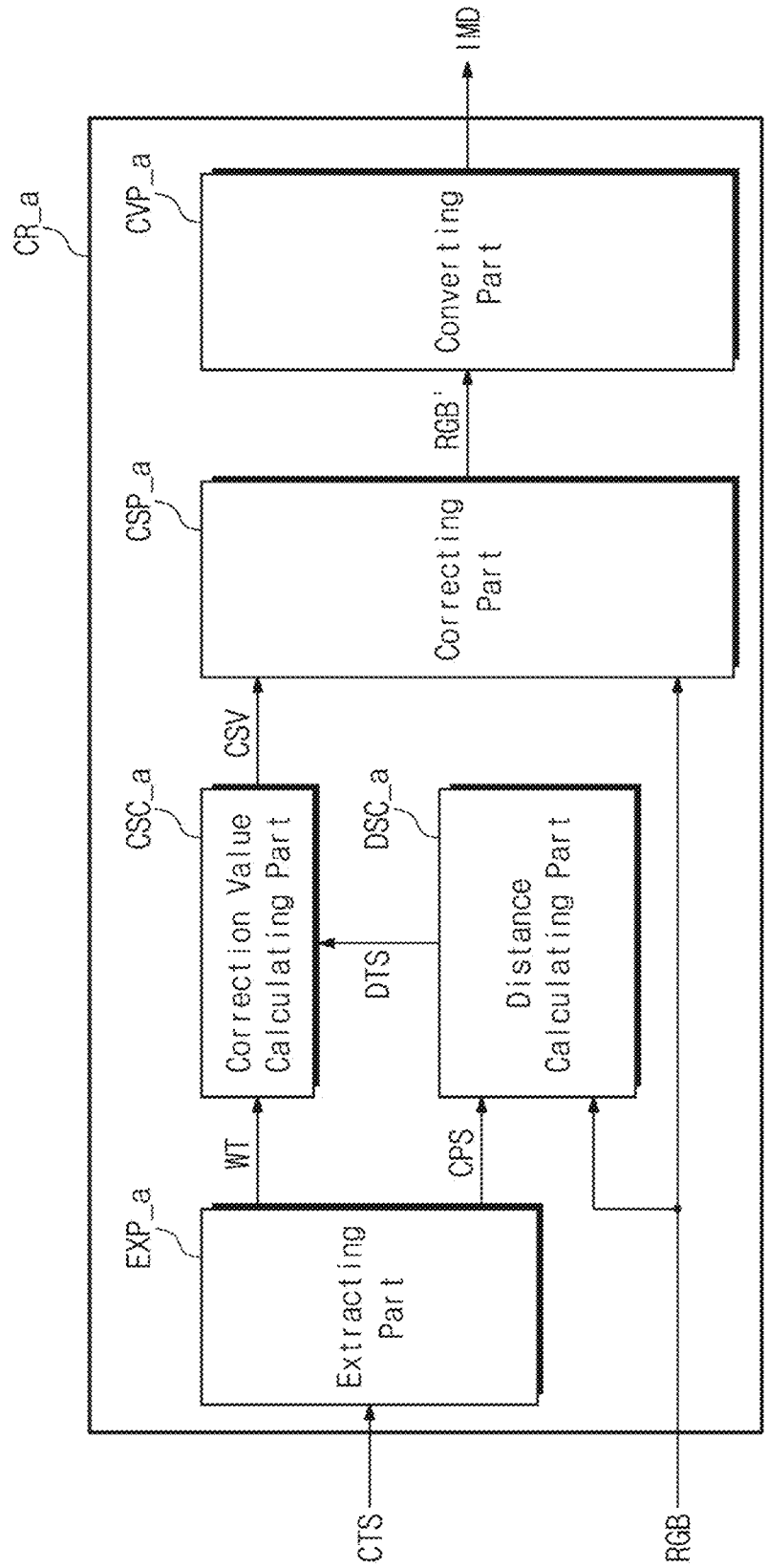
Figure 5A:
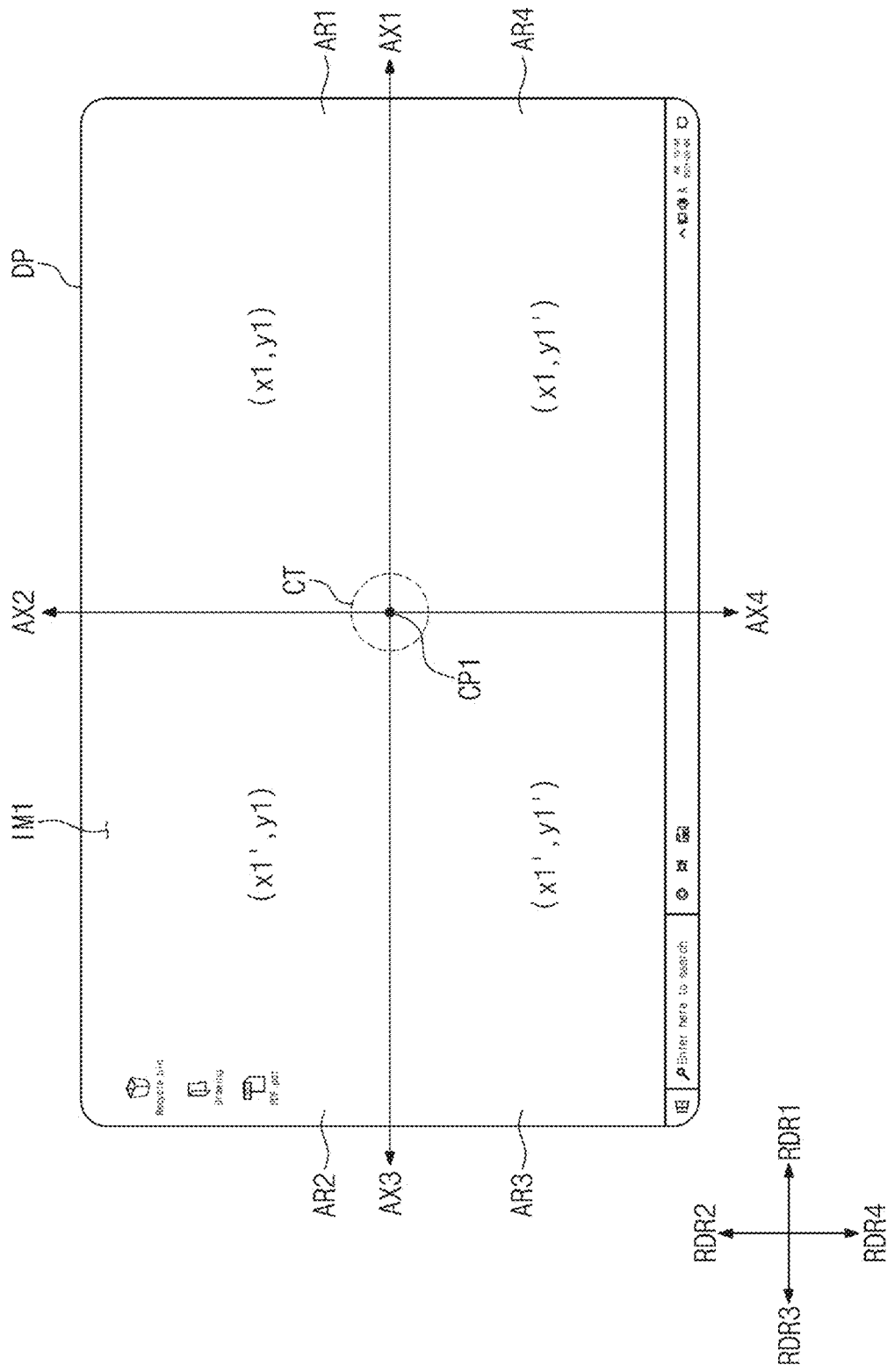
Figure 5B:
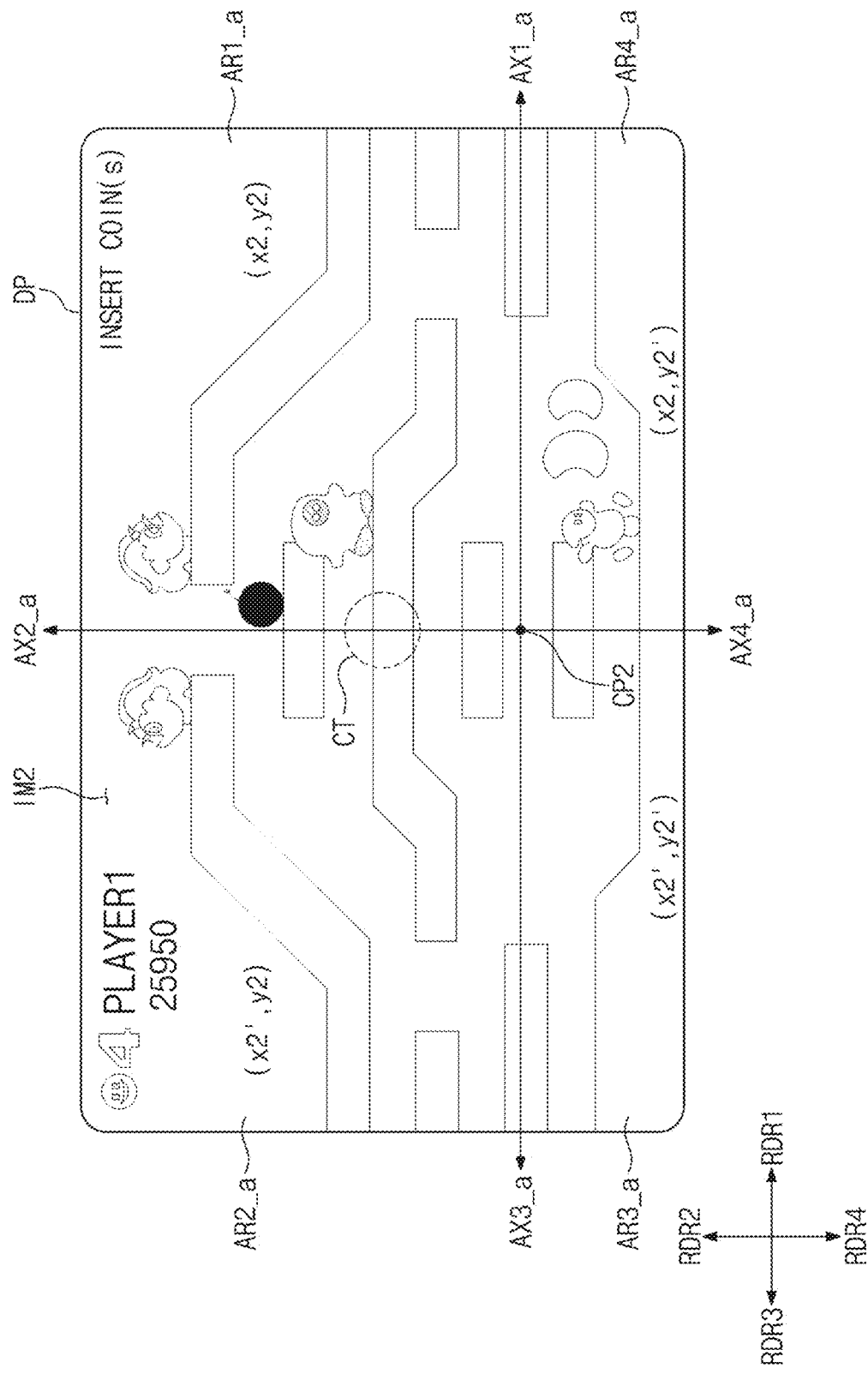
Figure 6:
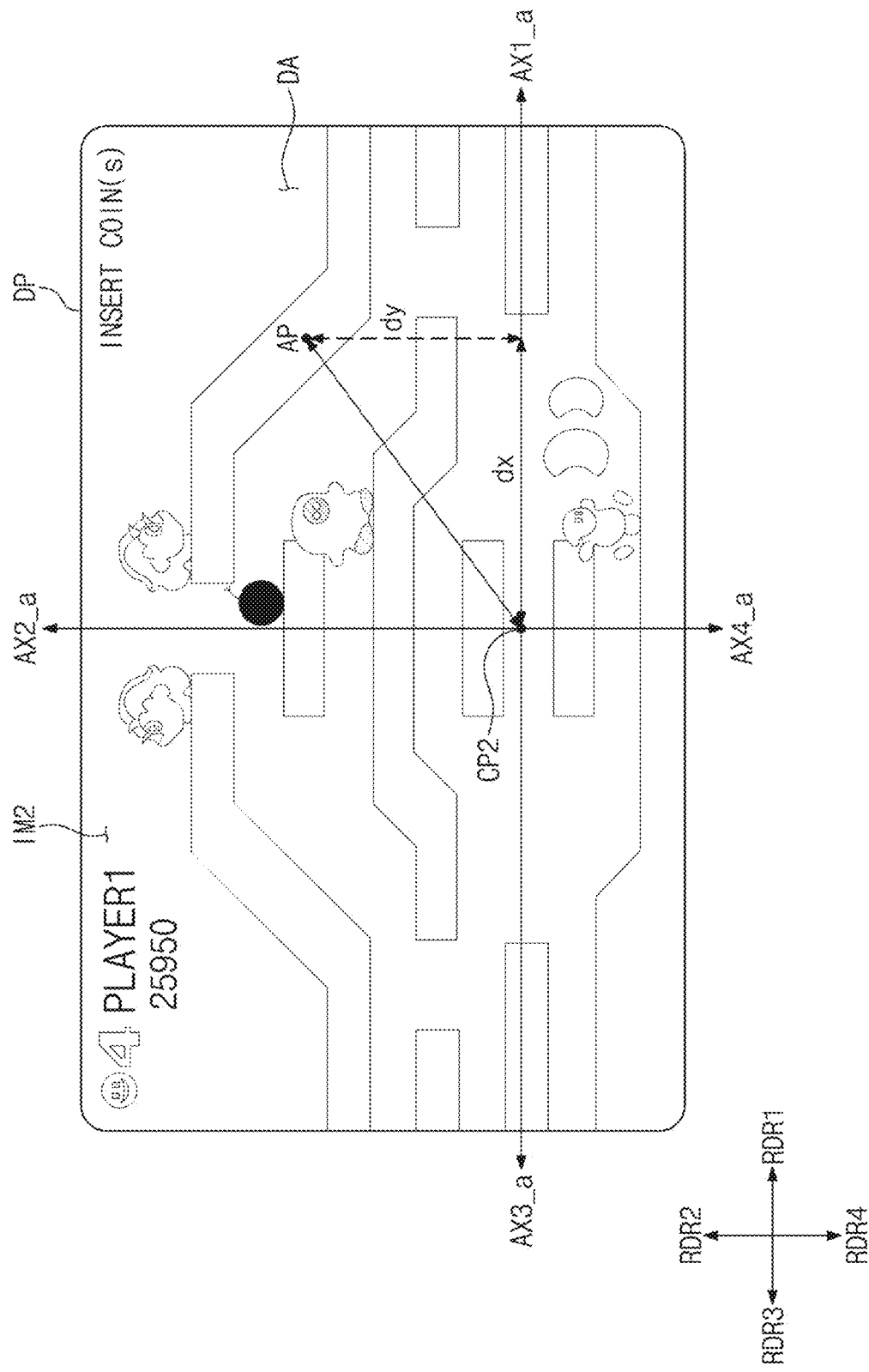
FIG. 6 is a conceptual diagram for describing a distance between a location of a display panel, at which image signals are displayed, and a criterion point, according to an embodiment of the disclosure.
Figure 7A:
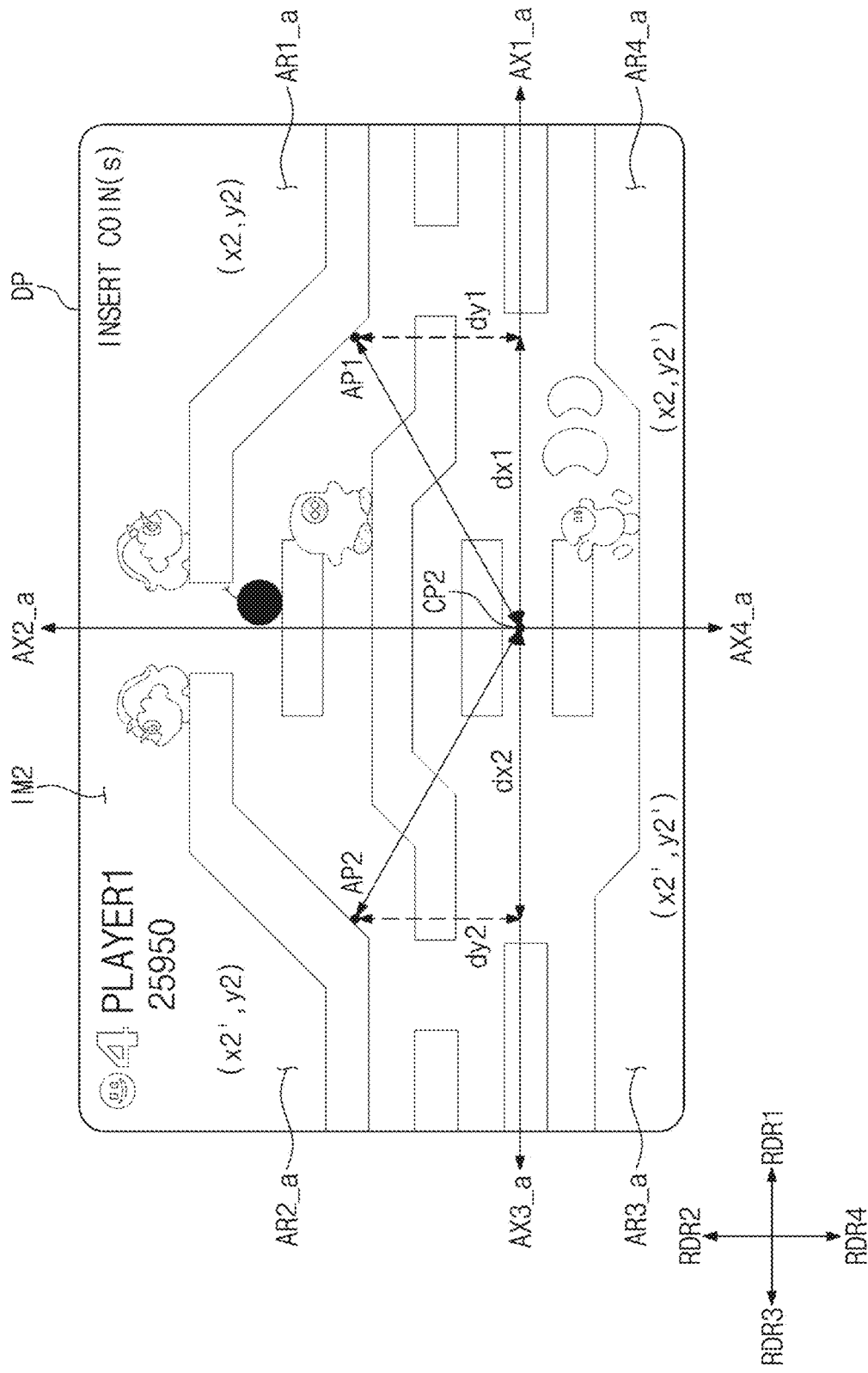
FIGS. 7A and 7B are conceptual diagrams for describing a weight for each of areas, according to embodiments of the disclosure.
Figure 7B:
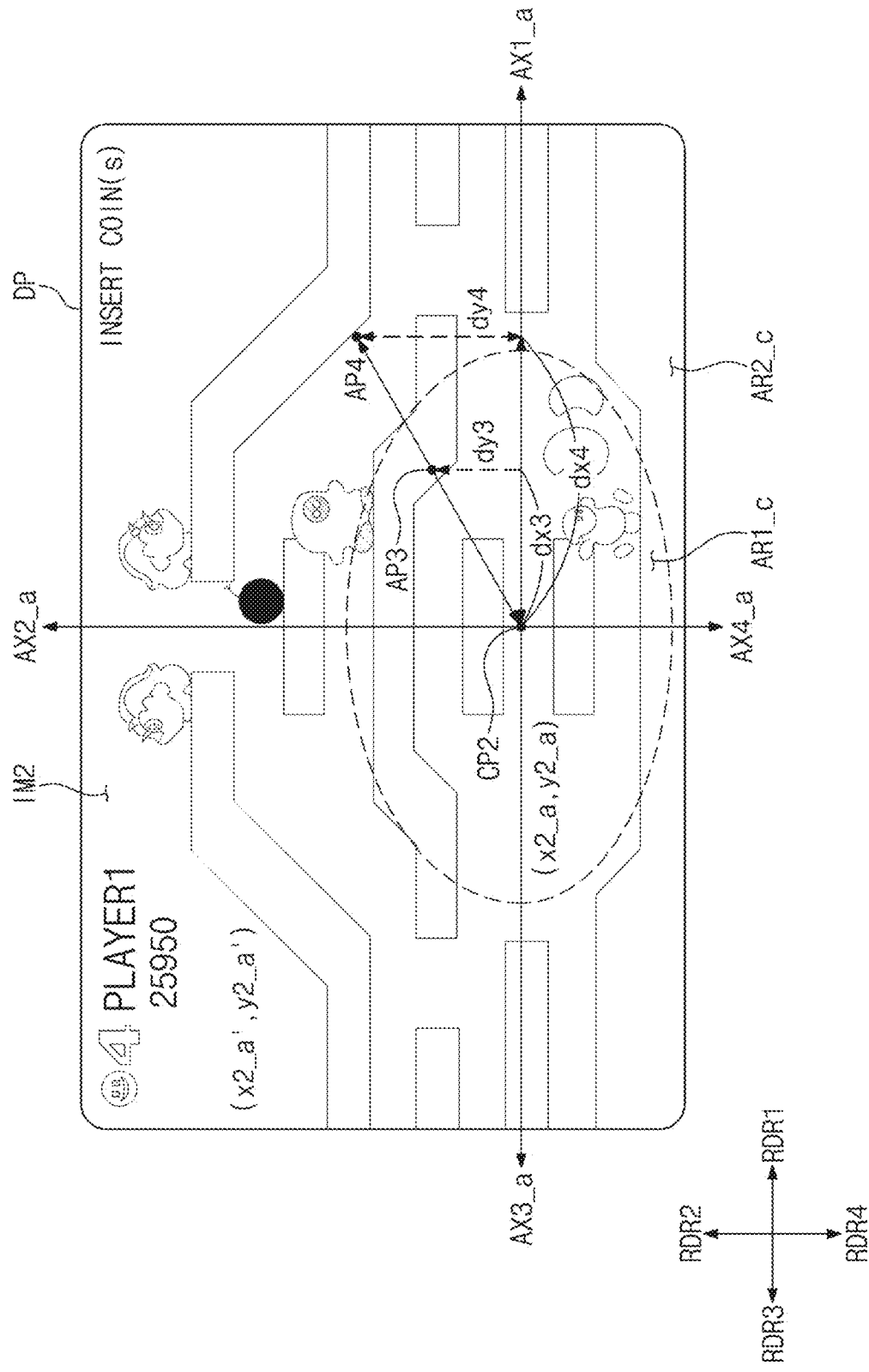

FIGS. 4A and 4B are block diagrams for describing how an extracting part and a controller operate depending on a control signal, according to embodiments of the disclosure. FIGS. 5A to 5C are conceptual diagrams for describing a criterion point and a weight varying depending on a kind of an image, according to embodiments of the disclosure. FIG. 6 is a conceptual diagram for describing a distance between a location of a display panel, at which image signals are displayed, and a criterion point, according to an embodiment of the disclosure. FIGS. 7A and 7B are conceptual diagrams for describing a weight for each of areas, according to embodiments of the disclosure.

Referring to FIG. 4A, an embodiment of the panel driving block PDB may include the extracting part EXP and the controller CR.

In an embodiment of the disclosure, the extracting part EXP receives the control signal CTS. The extracting part EXP may generate the criterion point signal CPS based on the control signal CTS. In such an embodiment, the extracting part EXP may generate the weight WT based on the control signal CTS.

Referring to FIGS. 4A and 5A to 5C, the control signal CTS include information about a kind or type of the image IM (refer to FIG. 1) to be displayed at the display panel DP. A location of a criterion point CP1, CP2, or CP3, which the panel driving block PDB generates based on the control signal CTS, and a value of the weight WT, which the panel driving block PDB generates based on the control signal CTS, may vary depending on a kind or type of the image IM to be displayed at the display panel DP. In an embodiment of the disclosure, a graphic processing device may transmit the control signal CTS to the panel driving block PDB.

In an embodiment of the disclosure, the panel driving block PDB may generate the criterion point signal CPS including information about the criterion point CP1, CP2, or CP3. The criterion point CP1, CP2, or CP3 may be a point where a gaze of the user US (refer to FIG. 11A) using the display device DD is most focused among the display panel DP. The panel driving block PDB may generate the weight WT based on a frequency at which the gaze of the user US is pointed with respect to the criterion point CP1, CP2, or CP3.

In a case where a first image (or a first type image) IM1 is displayed at the display panel DP, the criterion point signal CPS may include information about a location of the first criterion point CP1. In a case where a second image (or a second type image) IM2 is displayed at the display panel DP, the criterion point signal CPS may include information about a location of the second criterion point CP2. In a case where a third image (or a third type image) IM3 is displayed at the display panel DP, the criterion point signal CPS may include information about a location of the third criterion point CP3.

A conceptual diagram in which the first image IM1 is displayed at the display panel DP is illustrated in FIG. 5A. In an embodiment of the disclosure, the first image IM1 may be a background screen of an operating system executable by the display device DD. However, the disclosure is not limited thereto. In an embodiment, for example, the first image IM1 may be an image in which there is no movement (or motion) during a given time. In such an embodiment, the panel driving block PDB receives the control signal CTS including information indicating that the first image IM1 is displayed at the display panel DP.

The first criterion point CP1 and the weight WT included in the criterion point signal CPS that the panel driving block PDB generates based on the control signal CTS including the information indicating that the first image IM1 is displayed at the display panel DP are illustrated in FIGS. 4A and 5A.

When the first image IM1 is displayed at the display panel DP, the gaze of the user US using the display device DD may be most focused on a central portion CT of the display panel DP. Accordingly, the first criterion point CP1 included in the criterion point signal CPS that the panel driving block PDB generates may be located in the central portion CT. However, the disclosure is not limited thereto. Alternatively, when the first image IM1 is displayed at the display panel DP, a location of the first criterion point CP1 may not be included in the central portion CT.

In an embodiment of the disclosure, when the first image IM1 is displayed at the display panel DP, a frequency at which the gaze of the user US is pointed in a first reference direction RDR1 with respect to the first criterion point CP1 may be equal to a frequency at which the gaze of the user US is pointed in a third reference direction RDR3 away from the first reference direction RDR1. Accordingly, in the weight WT that the panel driving block PDB extracts, a first direction weight x1 in the first reference direction RDR1 from the first criterion point CP1 may be equal to a third direction weight x1' in the third reference direction RDR3 from the first criterion point CP1.

In an embodiment of the disclosure, when the first image IM1 is displayed at the display panel DP, a frequency at which the gaze of the user US is pointed in a second reference direction RDR2, which is a direction intersecting the first reference direction RDR1, with respect to the first criterion point CP1 may be equal to a frequency at which the gaze of the user US is pointed in a fourth reference direction RDR4 away from the second reference direction RDR2. Accordingly, in the weight WT that the panel driving block PDB extracts, a second direction weight y1 in the second reference direction RDR2 from the first criterion point CP1 may be equal to a fourth direction weight y1' in the fourth reference direction RDR4 from the first criterion point CP1. In an embodiment of the disclosure, the first reference direction RDR1 may be a direction parallel to the first direction DR1 (refer to FIG. 1). The second reference direction RDR2 may be a direction parallel to the second direction DR2 (refer to FIG. 1).

The display panel DP may include a plurality of areas AR1, AR2, AR3, and AR4 divided with respect to the first criterion point CP1.

The areas AR1, AR2, AR3, and AR4 includes a first area AR1 corresponding to a first quadrant defined by a first axis AX1 extending from the first criterion point CP1 in the first reference direction RDR1 and a second axis AX2 extending from the first criterion point CP1 in the second reference direction RDR2. The areas AR1, AR2, AR3, and AR4 includes a second area AR2 corresponding to a second quadrant defined by a third axis AX3 extending from the first criterion point CP1 in the third reference direction RDR3 and the second axis AX2. The areas AR1, AR2, AR3, and AR4 includes a third area AR3 corresponding to a third quadrant defined by a fourth axis AX4 extending from the first criterion point CP1 in the fourth reference direction RDR4 and the third axis AX3. The areas AR1, AR2, AR3, and AR4 includes a fourth area AR4 corresponding to a fourth quadrant defined by the first axis AX1 and the fourth axis AX4.

The weight WT may include first to fourth weights corresponding to the first to fourth areas AR1 to AR4, respectively. In the weight WT, the first weight corresponding to the first area AR1 may include the first direction weight x1 and the second direction weight y1. In the weight WT, the second weight corresponding to the second area AR2 may include the third direction weight x1' and the second direction weight y1. In the weight WT, the third weight corresponding to the third area AR3 may include the third direction weight x1' and the fourth direction weight y1'. In the weight WT, the fourth weight corresponding to the fourth area AR4 may include the first direction weight x1 and the fourth direction weight y1'. In an embodiment of the disclosure, the first to fourth weights may have a same value as each other.

A conceptual diagram in which the second image IM2 is displayed at the display panel DP is illustrated in FIG. 5B. In an embodiment of the disclosure, the second image IM2 may be an image of a game that is executed by the display device DD. However, the disclosure is not limited thereto. The second image IM2 may be an image in which a motion/movement is made by an external input that the user US (refer to FIG. 11A) provides to the display device DD. In such an embodiment, the panel driving block PDB receives the control signal CTS including information indicating that the second image IM2 is displayed at the display panel DP.

The second criterion point CP2 and the weight WT included in the criterion point signal CPS that the panel driving block PDB generates based on the control signal CTS including the information indicating that the second image IM2 is displayed at the display panel DP are illustrated in FIGS. 4A and 5B.

When the second image IM2 is displayed at the display panel DP, the gaze of the user US using the display device DD may be most focused on a point located in the fourth reference direction RDR4 from the central portion CT of the display panel DP. Accordingly, the second criterion point CP2 included in the criterion point signal CPS that the panel driving block PDB generates may be located at a point spaced from the central portion CT in the fourth reference direction RDR4. However, the disclosure is not limited thereto. A location of the second criterion point CP2 when the second image IM2 is displayed at the display panel DP may vary depending on a kind of a game to be executed by the display device DD. In an embodiment of the disclosure, a location of the second criterion point CP2 may be located at a point spaced from the central portion CT in the second reference direction RDR2. Also, a location of the second criterion point CP2 may be located at a point spaced from the central portion CT in the first reference direction RDR1 or in a direction away from the third reference direction RDR3.

In an embodiment of the disclosure, when the second image IM2 is displayed at the display panel DP, a frequency at which the gaze of the user US is pointed in the first reference direction RDR1 with respect to the second criterion point CP2 may be different from a frequency at which the gaze of the user US is pointed in the third reference direction RDR3. Accordingly, in the weight WT that the panel driving block PDB extracts, a first direction weight x2 in the first reference direction RDR1 from the second criterion point CP2 may be different from a third direction weight x2' in the third reference direction RDR3 from the second criterion point CP2. However, the disclosure is not limited thereto. Values of the first direction weight x2 and the third direction weight x2' may be equal to each other depending on a frequency at which the gaze of the user US is pointed in the first reference direction RDR1 with respect to the second criterion point CP2 and a frequency at which the gaze of the user US is pointed in the third reference direction RDR3 with respect to the second criterion point CP2.

In an embodiment of the disclosure, when the second image IM2 is displayed at the display panel DP, the degree to which the gaze of the user US is pointed in the second reference direction RDR2 with respect to the second criterion point CP2 may be different from the degree to which the gaze of the user US is pointed in the fourth reference direction RDR4. Accordingly, in the weight WT that the panel driving block PDB extracts, a second direction weight y2 in the second reference direction RDR2 from the second criterion point CP2 may be different from a fourth direction weight y2' in the fourth reference direction RDR4 from the second criterion point CP2. However, the disclosure is not limited thereto. Values of the second direction weight y2 and the fourth direction weight y2' may be equal to each other depending on a frequency at which the gaze of the user US is pointed in the second reference direction RDR2 with respect to the second criterion point CP2 and a frequency at which the gaze of the user US is pointed in the fourth reference direction RDR4 with respect to the second criterion point CP2.

The display panel DP may include a plurality of areas AR1_a, AR2_a, AR3_a, and AR4_a divided with respect to the second criterion point CP2.

The areas AR1_a, AR2_a, AR3_a, and AR4_a includes a first area AR1_a corresponding to a first quadrant defined by a first axis AX1_a extending from the second criterion point CP2 in the first reference direction RDR1 and a second axis AX2_a extending from the second criterion point CP2 in the second reference direction RDR2. The areas AR1_a, AR2_a, AR3_a, and AR4_a includes a second area AR2_a corresponding to a second quadrant defined by a third axis AX3_a extending from the second criterion point CP2 in the third reference direction RDR3 and the second axis AX2_a. The areas AR1_a, AR2_a, AR3_a, and AR4_a includes a third area AR3_a corresponding to a third quadrant defined by a fourth axis AX4_a extending from the second criterion point CP2 in the fourth reference direction RDR4 and the third axis AX3_a. The areas AR1_a, AR2_a, AR3_a, and AR4_a includes a fourth area AR4_a corresponding to a fourth quadrant defined by the first axis AX1_a and the fourth axis AX4_a.

The weight WT may include first to fourth weights corresponding to the first to fourth areas AR1_a to AR4_a, respectively. In the weight WT, the first weight corresponding to the first area AR1_a may include the first direction weight x2 and the second direction weight y2. In the weight WT, the second weight corresponding to the second area AR2_a may include the third direction weight x2' and the second direction weight y2. In the weight WT, the third weight corresponding to the third area AR3_a may include the third direction weight x2' and the fourth direction weight y2'. In the weight WT, the fourth weight corresponding to the fourth area AR4_a may include the first direction weight x2 and the fourth direction weight y2'. In an embodiment of the disclosure, the first to fourth weights may have different values from each other.

A conceptual diagram in which the third image IM3 is displayed at the display panel DP is illustrated in FIG. 5C. In an embodiment of the disclosure, the third image IM3 may be an image of a movie to be executed by the display device DD. However, the disclosure is not limited thereto. The third image IM3 may be a video in which a motion/movement is made even without an external input that the user US (refer to FIG. 11A) provides to the display device DD. In this case, the panel driving block PDB receives the control signal CTS including information indicating that the third image IM3 is displayed at the display panel DP.

The third criterion point CP3 and the weight WT included in the criterion point signal CPS that the panel driving block PDB generates based on the control signal CTS including the information indicating that the third image IM3 is displayed at the display panel DP are illustrated in FIGS. 4A and 5C.

When the third image IM3 is displayed at the display panel DP, the gaze of the user US using the display device DD may be most focused on the central portion CT of the display panel DP. Accordingly, the third criterion point CP3 included in the criterion point signal CPS that the panel driving block PDB generates may be located in the central portion CT. However, the disclosure is not limited thereto. Alternatively, a location of the third criterion point CP3 when the third image IM3 is displayed at the display panel DP may not be included in the central portion CT.

In an embodiment of the disclosure, when the third image IM3 is displayed at the display panel DP, a frequency at which the gaze of the user US is pointed in the first reference direction RDR1 with respect to the third criterion point CP3 may be equal to a frequency at which the gaze of the user US is pointed in the third reference direction RDR3. Accordingly, in the weight WT that the panel driving block PDB extracts, a first direction weight x3 in the first reference direction RDR1 from the third criterion point CP3 may be equal to a third direction weight x3' in the third reference direction RDR3 from the third criterion point CP3.

In an embodiment of the disclosure, when the third image IM3 is displayed at the display panel DP, a frequency at which the gaze of the user US is pointed in the second reference direction RDR2 with respect to the third criterion point CP3 may be different from a frequency at which the gaze of the user US is pointed in the fourth reference direction RDR4. Accordingly, in the weight WT that the panel driving block PDB extracts, a second direction weight y3 in the second reference direction RDR2 from the third criterion point CP3 may be different to a fourth direction weight y3' in the fourth reference direction RDR4 from the third criterion point CP3.

The display panel DP may include a plurality of areas AR1_b, AR2_b, AR3_b, and AR4_b divided with respect to the third criterion point CP3.

The areas AR1_b, AR2_b, AR3_b, and AR4_b includes a first area AR1_b corresponding to a first quadrant defined by a first axis AX1_b extending from the third criterion point CP3 in the first reference direction RDR1 and a second axis AX2_b extending from the third criterion point CP3 in the second reference direction RDR2. The areas AR1_b, AR2_b, AR3_b, and AR4_b includes a second area AR2_b corresponding to a second quadrant defined by a third axis AX3_b extending from the third criterion point CP3 in the third reference direction RDR3 and the second axis AX2_b. The areas AR1_b, AR2_b, AR3_b, and AR4_b includes a third area AR3_b corresponding to a third quadrant defined by a fourth axis AX4_b extending from the third criterion point CP3 in the fourth reference direction RDR4 and the third axis AX3_b. The areas AR1_b, AR2_b, AR3_b, and AR4_b includes a fourth area AR4_b corresponding to a fourth quadrant defined by the first axis AX1_b and the fourth axis AX4_b The weight WT may include first to fourth weights corresponding to the first to fourth areas AR1_b to AR4_b, respectively. In the weight WT, the first weight corresponding to the first area AR1_b may include the first direction weight x3 and the second direction weight y3. In the weight WT, the second weight corresponding to the second area AR2_b may include the third direction weight x3' and the second direction weight y3. In the weight WT, the third weight corresponding to the third area AR3_b may include the third direction weight x3' and the fourth direction weight y3'. In the weight WT, the fourth weight corresponding to the fourth area AR4_b may include the first direction weight x3 and the fourth direction weight y3'. In an embodiment of the disclosure, the first and second weights may have a same value as each other. The third and fourth weights may have a same value as each other. The first and fourth weights may have different values from each other.

Referring back to FIGS. 4A and 6, the controller CR includes a distance calculating part DSC, a correction value calculating part CSC, a correcting part CSP, and a converting part CVP. Hereinafter, for convenience of description, a case where the second image IM2 is displayed at the display panel DP will be described in detail with reference to FIGS. 6, 7A and 7B.

The distance calculating part DSC receives the image signals RGB from the outside and receives the criterion point signal CPS from the extracting part EXP. The distance calculating part DSC may calculate a distance between the second criterion point CP2 and a location of the display panel DP, at which each of the image signals RGB is displayed, and may extract information about the distance (hereinafter referred to as "distance information" DTS). When one of locations of the display panel DP, at which the image signals RGB are respectively displayed, is referred to as a "display location" AP, the distance information DTS includes a first direction distance dx between the display location AP and the second criterion point CP2 in the first reference direction RDR1 and a second direction distance dy between the display location AP and the second criterion point CP2 in the second reference direction RDR2.

In an embodiment of the disclosure, the first direction distance dx and the second direction distance dy between the display location AP and the second criterion point CP2 may change depending on a location of the second criterion point CP2. Although not illustrated in FIG. 6, in a case where the second criterion point CP2 is located at the central portion CT (refer to FIG. 5A), the first direction distance dx between the display location AP and the second criterion point CP2 may not be changed, but the second direction distance dy therebetween may become small.

Accordingly, the distance information DTS may change depending on a location of the second criterion point CP2. As a result, the distance information DTS that the distance calculating part DSC extracts may change depending on a kind or type of the image IM (refer to FIG. 1) to be displayed at the display panel DP.

The correction value calculating part CSC receives the distance information DTS from the distance calculating part DSC. The correction value calculating part CSC may generate a correction value CSV based on the distance information DTS. In an embodiment of the disclosure, the correction value calculating part CSC may further receive the weight WT from the extracting part EXP. The correction value calculating part CSC may generate the correction value CSV based on the distance information DTS and the weight WT.

Referring to FIGS. 4A, 5B, and 7A, one location belonging to the first area AR1_a from among the locations of the display panel DP, at which the image signals RGB are respectively displayed, may be referred to as a "first display location" AP1, and one location belonging to the second area AR2_a from among the locations of the display panel DP, at which the image signals RGB are displayed, may be referred to as a "second display location" AP2.

A magnitude (or value) of a first direction distance dx1 between the first display location AP1 and the second criterion point CP2 in the first reference direction RDR1 may be equal to a magnitude of a third direction distance dx2 between the second display location AP2 and the second criterion point CP2 in the third reference direction RDR3. In an embodiment of the disclosure, signs of the first direction distance dx1 and the third direction distance x3 may be opposite to each other, but the magnitudes thereof may be equal to each other. A magnitude of a second direction distance dy1 between the first display location AP1 and the second criterion point CP2 in the second reference direction RDR2 may be equal to a magnitude of a fourth direction distance dy2 between the second display location AP2 and the second criterion point CP2 in the second reference direction RDR2.

However, a value of a first weight corresponding to the first area AR1_a and a value of a second weight corresponding to the second area AR2_a may be different from each other. The first weight may include a first direction weight x2 and a second direction weight y2. The second weight may include a third direction weight x2' and the second direction weight y2.

In an embodiment of the disclosure, the correction value CSV that the correction value calculating part CSC generates based on the distance information DTS and the weight WT may be defined by Equation 1 below.

$$CSV = RFV - \left( \frac{Gx \times (dx)^2}{R_x} + \frac{Gy \times (dy)^2}{R_y} \right) \quad \text{[Equation 1]}$$

In Equation 1, "CSV" denotes the correction value CSV, "RFV" denotes the correction value CSV at the second criterion point CP2 and is 1, Gx denotes the first direction weight x2 or the third direction weight x2', Gy denotes the second direction weight y2 or the fourth direction weight y2', "dx" denotes the first direction distance dx1 or the third direction distance dx2, "dy" denotes the second direction distance dy1 or the fourth direction distance dy2, $R_x$ denotes a resolution in the first direction DR1 (refer to FIG. 3) associated with the pixel PX (refer to FIG. 3) included in the display panel DP, $R_y$ denotes a resolution in the second direction DR2 (refer to FIG. 3) associated with the pixel PX included in the display panel DP.

Accordingly, the correction value CSV that the correction value calculating part CSC generates based on the distance information DTS and the weight WT may have different values at the first display location AP1 and the second display location AP2.

Referring to FIGS. 4A and 7B, the display panel DP may include a plurality of areas AR1_c and AR2_c divided with respect to the second criterion point CP2.

The areas AR1_c and AR2_c includes a first area AR1_c including the second criterion point CP2 and a second area AR2_c surrounding the first area AR1_c. In an embodiment of the disclosure, the display panel DP may further include a third area (not shown) surrounding the second area AR2_c.

The panel driving block PDB may extract a first weight corresponding to the first area AR1_c and a second weight corresponding to the second area AR2_c, based on the control signal CTS. In an embodiment of the disclosure, the first weight and the second weight may have different values from each other. In an embodiment of the disclosure, the second weight may be greater in value than the first weight. In an embodiment of the disclosure, a first direction weight in the first reference direction RDR1 and a second direction weight in the second reference direction RDR2, which are included in the first weight, may have a same value as each other. In an embodiment of the disclosure, a first direction weight in the first reference direction RDR1 and a second direction weight in the second reference direction RDR2, which are included in the second weight, may have a same value as each other.

One location belonging to the first area AR1_c from among locations of the display panel DP, at which the image signals RGB are respectively displayed, may be referred to as a "third display location" AP3, and one location belonging to the second area AR2_c from among the locations of the display panel DP, at which the image signals RGB are displayed, may be referred to as a "fourth display location" AP4.

A magnitude of a sixth direction distance dx4 between the fourth display location AP4 and the second criterion point CP2 in the first reference direction RDR1 may be greater than a magnitude of a fifth direction distance dx3 between the third display location AP3 and the second criterion point CP2 in the first reference direction RDR1. The magnitude of the sixth direction distance dx4 may be two times the magnitude of the fifth direction distance dx3.

A magnitude of an eighth direction distance dy4 between the fourth display location AP4 and the second criterion point CP2 in the second reference direction RDR2 may be greater than a magnitude of a seventh direction distance dy3 between the third display location AP3 and the second criterion point CP2 in the second reference direction RDR2. The magnitude of the eighth direction distance dy4 may be two times the magnitude of the seventh direction distance dy3.

Accordingly, the correction value CSV that the correction value calculating part CSC generates based on the distance information DTS and the weight WT may have different values at the third display location AP3 and the fourth display location AP4. In an embodiment of the disclosure, a magnitude of the correction value CSV for the fourth display location AP4 may be greater than a magnitude of the correction value CSV for the third display location AP3. In this case, compared to a case where the first weight and the second weight have a same value as each other, the degree to which a magnitude of the correction value CSV for the fourth display location AP4 is greater than a magnitude of the correction value CSV for the third display location AP3 may become great in a case where when the second weight is greater in value than the first weight.

The correcting part CSP receives the image signals RGB from the outside and receives the correction value CSV from the correction value calculating part CSC. The correcting part CSP converts the image signals RGB based on the correction value CSV and thus generates the correction image signals RGB'.

In an embodiment of the disclosure, that the correcting part CSP converts the image signals RGB based on the correction value CSV and thus generates the correction image signals RGB' may be defined by Equation 2 below.

$$O_{RGB}=CSV \times i_{RGB} \quad \text{[Equation 2]}$$

In Equation 2, $O_{RGB}$ denotes the correction image signals RGB', "CSV" denotes the correction value CSV, and $i_{RGB}$ denotes the image signals RGB.

In an embodiment of the disclosure, the correction value CSV may be a value of 1 or less. A grayscale corresponding to the correction image signals RGB' may be smaller than a grayscale corresponding to the image signals RGB. In an embodiment of the disclosure, a magnitude of the correction value CSV corresponding to the image signals RGB decreases as a location of the display panel DP, at which the image signals RGB are displayed, becomes more distant from the second criterion point CP2. Accordingly, as a distance from the second criterion point CP2 increases, a difference between the grayscale corresponding to the correction image signals RGB' and the grayscale corresponding to the image signals RGB may become greater.

The converting part CVP receives the correction image signals RGB' from the correcting part CSP. The converting part CVP generates the image data IMD based on the correction image signals RGB'.

Referring to FIG. 4B, in an embodiment of the disclosure, an extracting part EXP_a may be included in a controller CR_a. The controller CR_a include the extracting part EXP_a, a distance calculating part DSC_a, a correcting part CSP_a, and a converting part CVP_a. In FIG. 4B, the same or like components as the components described above with reference to FIG. 4A are labeled with the same or like reference numerals, and any repetitive detailed description thereof will be omitted to avoid redundancy.

Figure 8A:
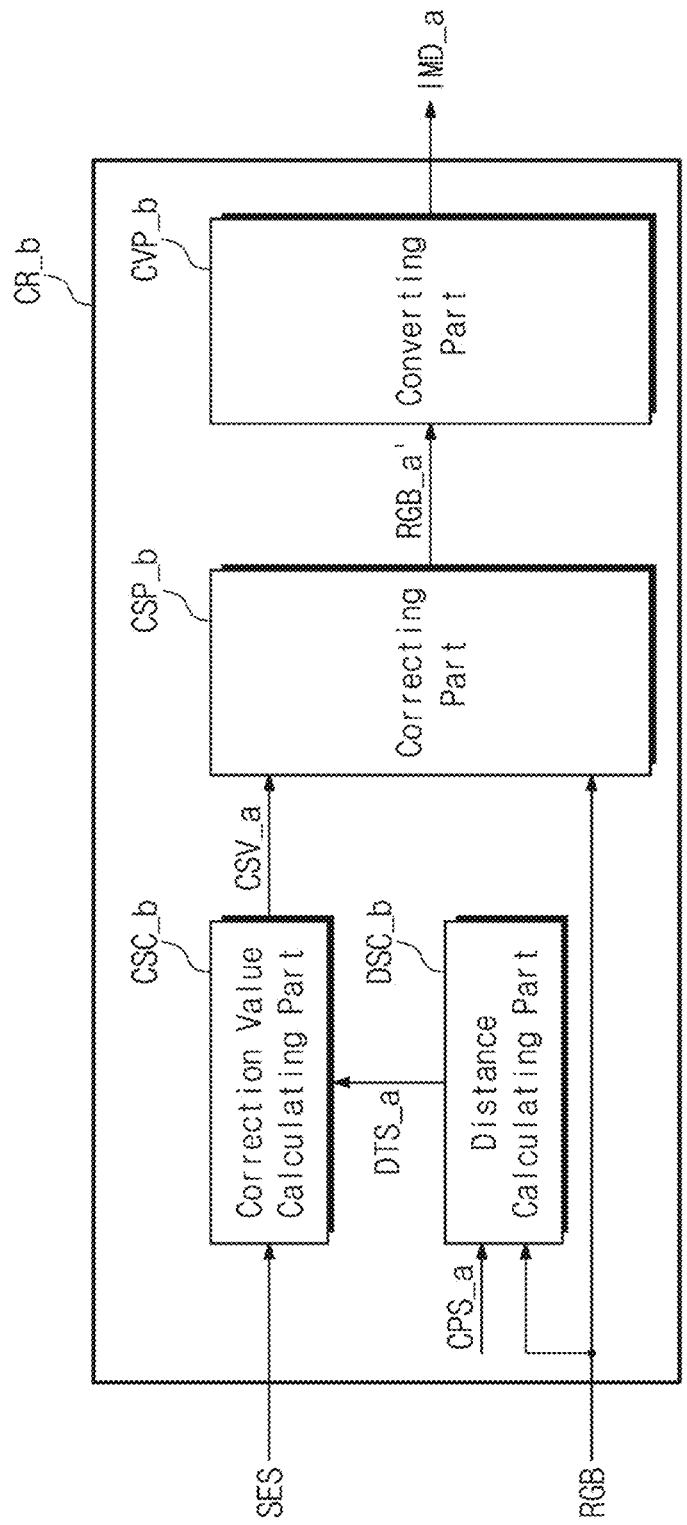
FIGS. 8A and 8B are block diagrams for describing how an extracting part and a controller operate depending on a setting signal, according to embodiments of the disclosure.
Figure 8B:
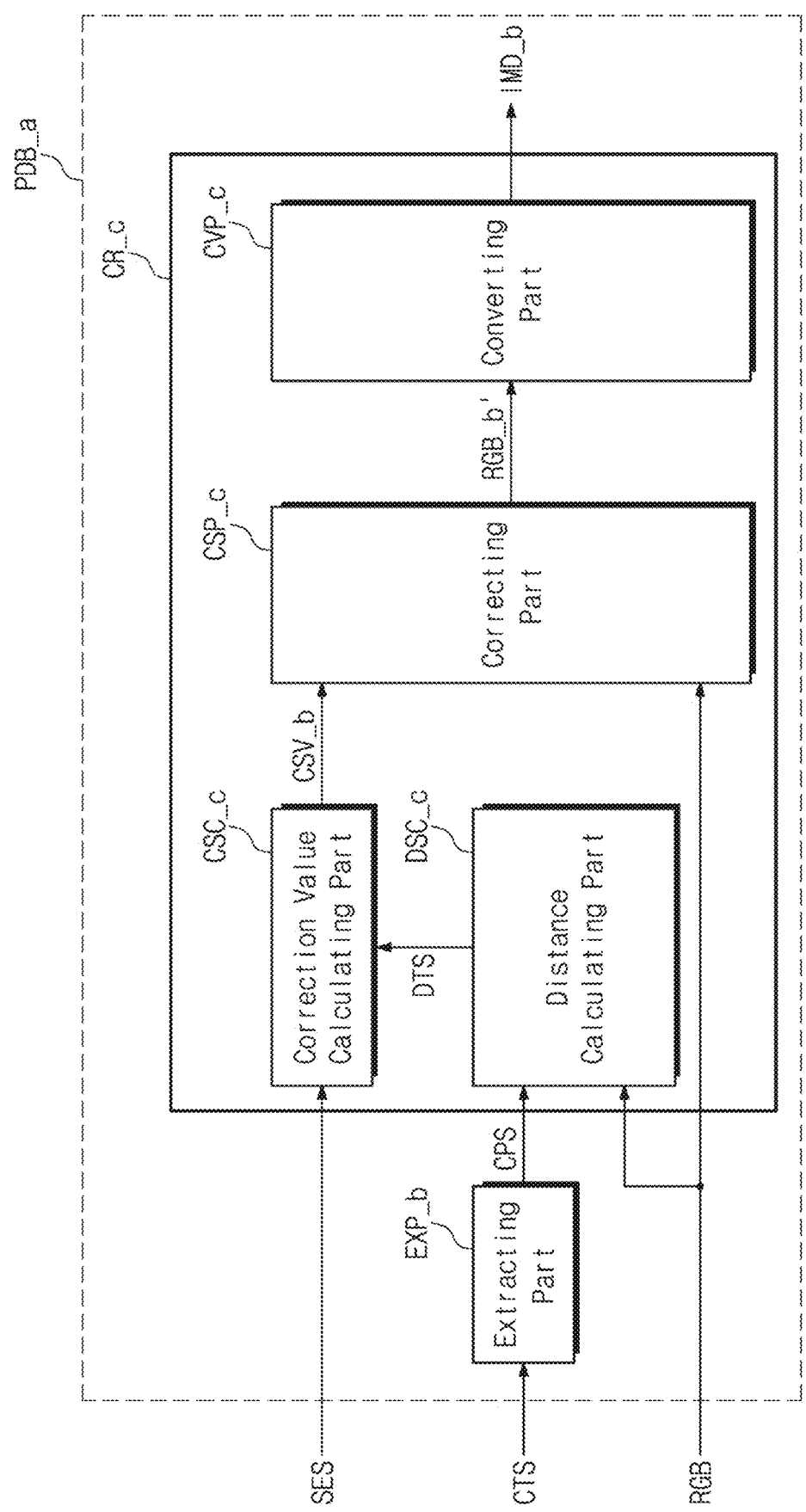
Figure 9:
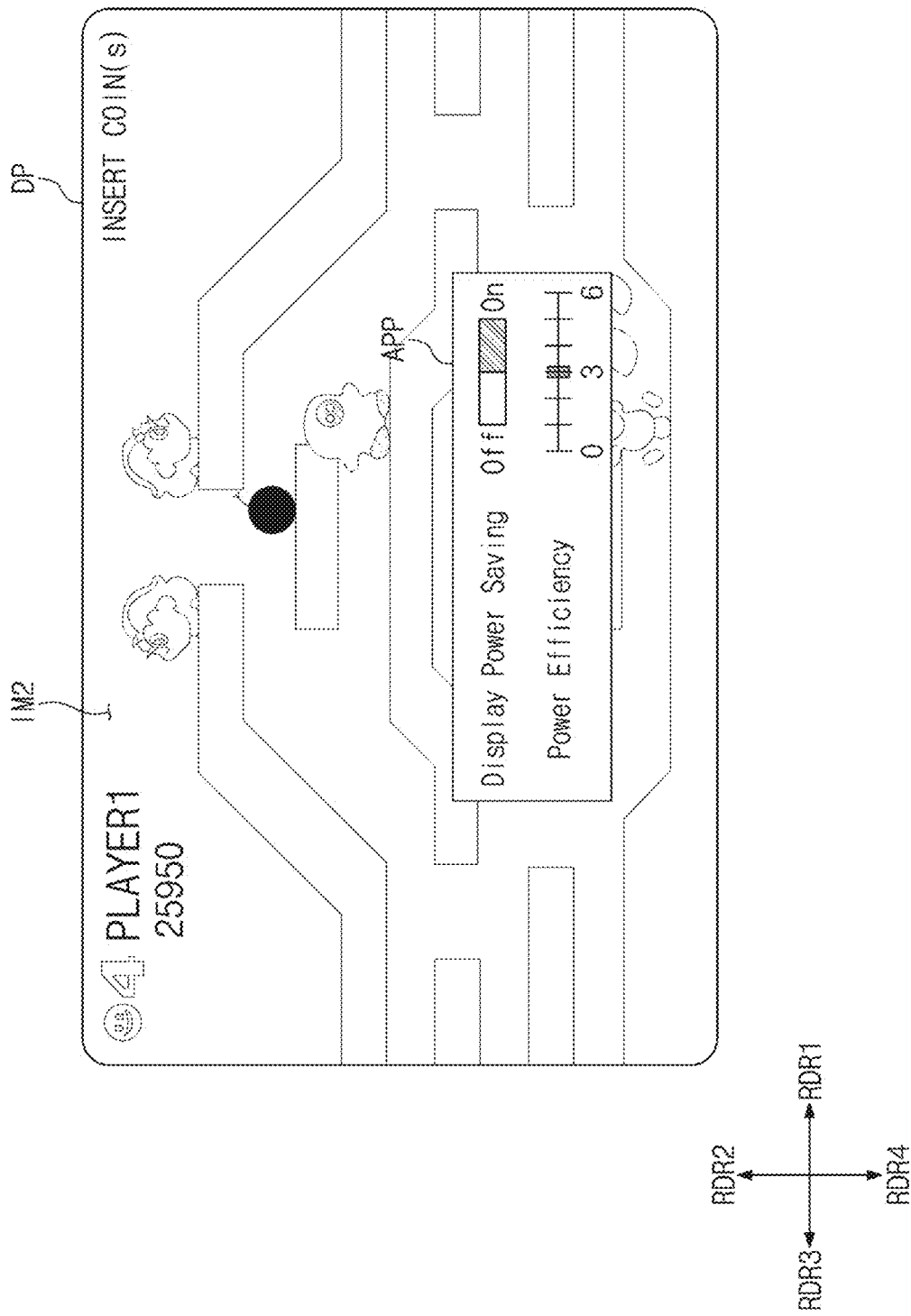
FIG. 9 is a conceptual diagram for describing a settings application capable of adjusting a magnitude of a weight, according to an embodiment of the disclosure.

FIGS. 8A and 8B are block diagrams for describing how an extracting part and a controller operate depending on a setting signal, according to embodiments of the disclosure. FIG. 9 is a conceptual diagram for describing a settings application capable of adjusting a magnitude of a weight, according to an embodiment of the disclosure. Hereinafter, for convenience, a case where the second image IM2 is displayed at the display panel DP will be described in detail.

Referring to FIG. 8A, an embodiment of a controller CR_b include a distance calculating part DSC_b, a correction value calculating part CSC_b, a correcting part CSP_b, and a converting part CVP_b. In FIG. 8A, the same or like components as the components described above with reference to FIG. 4A are labeled with the same or like reference numerals, and any repetitive detailed description thereof will be omitted to avoid redundancy.

In such an embodiment, the distance calculating part DSC_b receives the image signals RGB from an outside. The distance calculating part DSC_b receives a preset criterion point signal CPS_a. Information about a location of a criterion point for adjusting luminance of the image IM (refer to FIG. 1) may be included in the preset criterion point signal CPS_a. The preset criterion point signal CPS_a may include information about a location of a criterion point that is set regardless of a kind or type of the image IM to be displayed at the display panel DP.

The distance calculating part DSC_b may extract a distance between a preset criterion point and a location of the display panel DP (refer to FIG. 9), at which each of the image signals RGB is displayed, and may generate distance information DTS_a including the information about the distance. In an embodiment of the disclosure, the location of the preset criterion point may be located at the central portion CT (refer to FIG. 5A) regardless of a kind or type of the image IM.

The correction value calculating part CSC_b receives the distance information DTS_a from the distance calculating part DSC_b and receives a setting signal SES from the outside. The weight WT (refer to FIG. 4A) associated with the plurality of areas AR1_a, AR2_a, AR3_a, and AR4_a (refer to FIG. 5B) included in the display panel DP may be included in the setting signal SES. The correction value calculating part CSC_b may generate a correction value CSV_a based on the weight WT included in the setting signal SES and the distance information DTS_a.

Referring to FIG. 9, a settings application APP capable of adjusting a magnitude of the weight WT (refer to FIG. 4A) may be displayed at the display panel DP. A magnitude of the weight WT may be determined by an external input that selects a magnitude of the weight WT in the settings application APP. In an embodiment of the disclosure, the external input may be an input that is provided by the user US using the display device DD. The user US may adjust a magnitude of the weight WT through the settings application APP. In an embodiment of the disclosure, a magnitude of the weight WT may be determined depending on a magnitude that the user US selects on the "Power Efficiency" setting (or slider bar) displayed at the settings application APP. In an embodiment of the disclosure, the user US may adjust a magnitude of the weight WT through the settings application APP, in a state where the second image IM2 is displayed at the display panel DP. In an embodiment of the disclosure, a first direction weight in the first reference direction RDR1 and a second direction weight in the second reference direction RDR2, which are included in the weight WT set by the user US, may have a same value as each other. However, the disclosure is not limited thereto. In an alternative embodiment, for example, the settings application APP may further include separate settings that allow the user US to individually adjust the magnitude of the first direction weight and the magnitude of the second direction weight. An embodiment in which the user US is capable of selecting one of 0 to 6 as a magnitude of the weight WT is illustrated in FIG. 9, but the disclosure is not limited thereto. A magnitude of the weight WT, which the user US is capable of selecting, may be variously set for convenience of the user US.

Through the settings application APP, the user US may determine a magnitude of the weight WT for reducing power consumption of the display device DD in a state where the degradation of quality of the second image IM2 is not perceived. In an embodiment of the disclosure, when the user US determines a magnitude of the weight WT through the settings application APP, the graphic processing device may transmit the setting signal SES (refer to FIG. 8A) including information about the determined magnitude to the controller CR_b (refer to FIG. 8A).

In an embodiment of the disclosure, the user US may make setting through the settings application APP such that a grayscale of the image IM (refer to FIG. 1) to be displayed at the display panel DP does not decrease. In an embodiment of the disclosure, in a case where the user US selects "Off" on the "Display Power Saving" setting (or bar) displayed at the settings application APP, the grayscale of the image IM2 to be displayed at the display panel DP may not decrease. In this case, the converting part CVP_b (refer to FIG. 8A) may generate image data IMD_a (refer to FIG. 8A) based on the image signals RGB (refer to FIG. 8A). In a case where the user US selects "On" on the "Display Power Saving" setting, a magnitude of the weight WT may be set to the magnitude set on the "Power Efficiency" setting.

The correcting part CSP_b receives the image signals RGB from the outside and receives the correction value CSV_a from the correction value calculating part CSC_b. The correcting part CSP_b converts the image signals RGB based on the correction value CSV_a and thus generates correction image signals RGB The converting part CVP_b receives the correction image signals RGB_a from the correcting part CSP_b. The converting part CVP_b generates the image data IMD_a based on the correction image signals RGB_a'.

Referring to FIG. 8B, in an alternative embodiment, a panel driving block PDB_a may further include an extracting part EXP_b. In FIG. 8B, the same or like components as the components described above with reference to FIGS. 4A and 8A are labeled with the same or like reference numerals, and any repetitive detailed description thereof will be omitted to avoid redundancy.

In such an embodiment, the extracting part EXP_b receives the control signal CTS from the outside. The extracting part EXP_b may extract the criterion point signal CPS based on the control signal CTS.

A distance calculating part DSC_c receives the image signals RGB from the outside and receives the criterion point signal CPS from the extracting part EXP_b. The distance calculating part DSC_c calculates the distance information DTS between the second criterion point CP2 (refer to FIG. 5B) and a location of the display panel DP, at which each of the image signals RGB is displayed. In an embodiment of the disclosure, unlike the preset criterion point included in the preset criterion point signal CPS_a of FIG. 8A, the location of the criterion point included in the criterion point signal CPS received from the extracting part EXP_b may change depending on a kind or type of the image IM (refer to FIG. 1) to be displayed at the display panel DP (refer to FIG. 2).

A correction value calculating part CSC_c receives the setting signal SES from the outside and receives the distance information DTS from the distance calculating part DSC_c. The correction value calculating part CSC_c may generate a correction value CSV_b based on the weight WT included in the setting signal SES and the distance information DTS.

In an embodiment of the disclosure, when the second image IM2 is displayed at the display panel DP and the user US selects a magnitude of the weight WT through the settings application APP, the graphic processing device may transmit the control signal CTS to the extracting part EXP_b and may transmit the setting signal SES to a controller CR_c. Information indicating that the second image IM2 is displayed at the display panel DP may be included in the control signal CTS. Information about a magnitude of the weight WT that the user US sets through the settings application APP may be included in the setting signal SES.

A correcting part CSP_c receives the image signals RGB from the outside and receives the correction value CSV_b from the correction value calculating part CSC_c. The correcting part CSP_c converts the image signals RGB based on the correction value CSV_b and thus generates correction image signals RGB_b'.

A converting part CVP_c receives the correction image signals RGB_b' from the correcting part CSP_c. The converting part CVP_c generates image data IMD_b based on the correction image signals RGB_b'.

Figure 10:
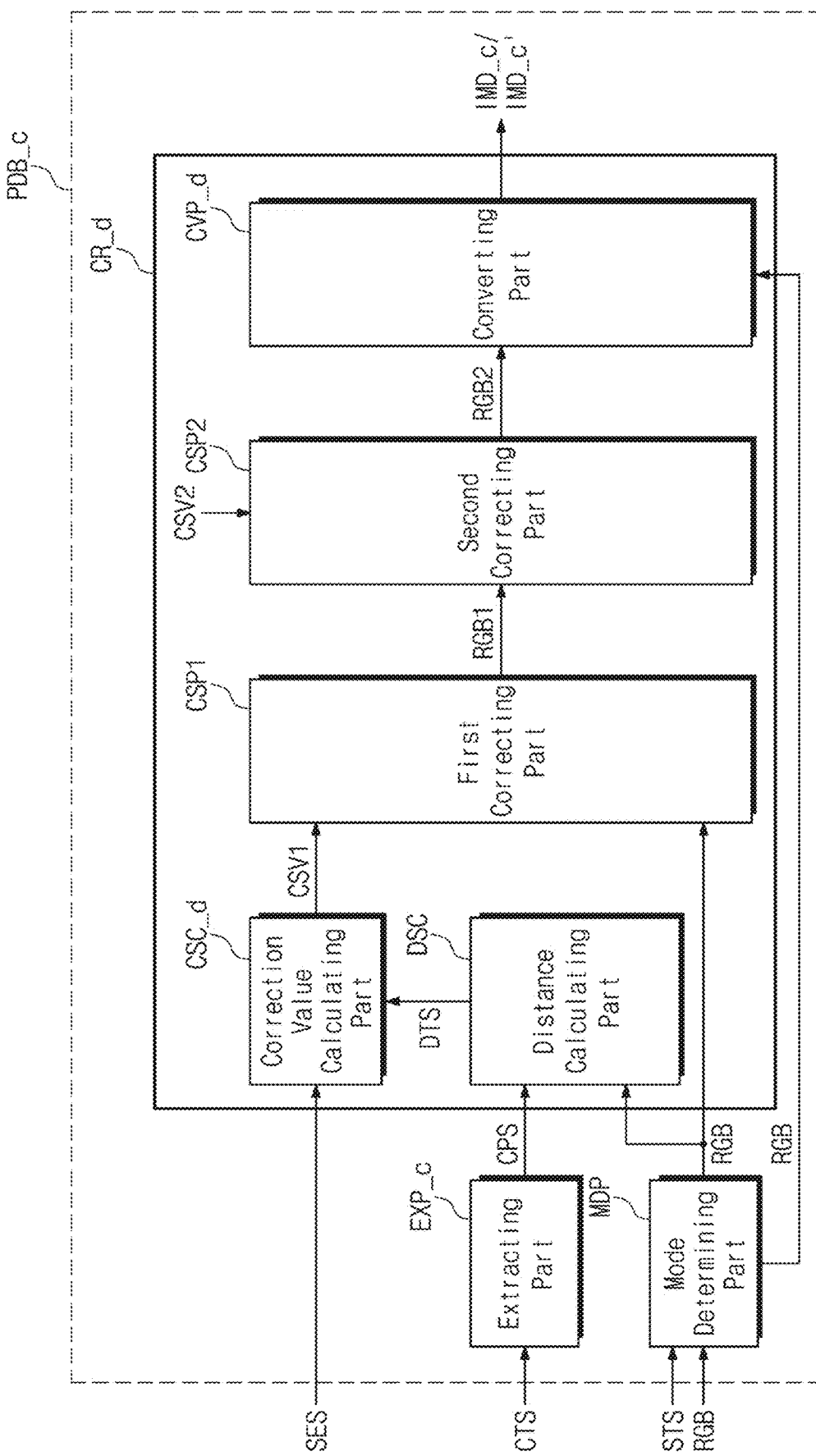
FIG. 10 is a block diagram for describing how an extracting part and a controller operate depending on a state signal, according to an embodiment of the disclosure.
Figure 11A:
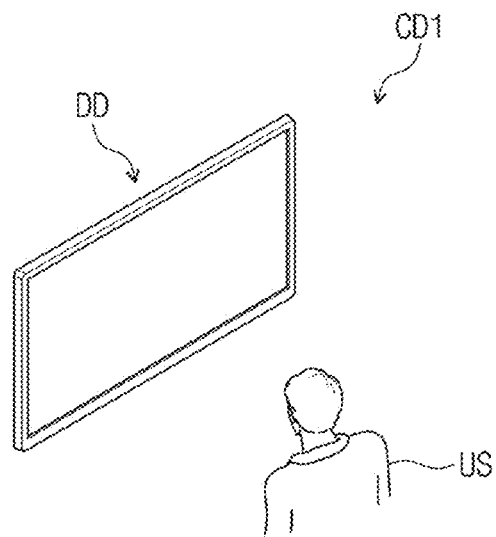
FIGS. 11A to 11C are conceptual diagrams for describing a state signal, according to embodiments of the disclosure.
Figure 11B:
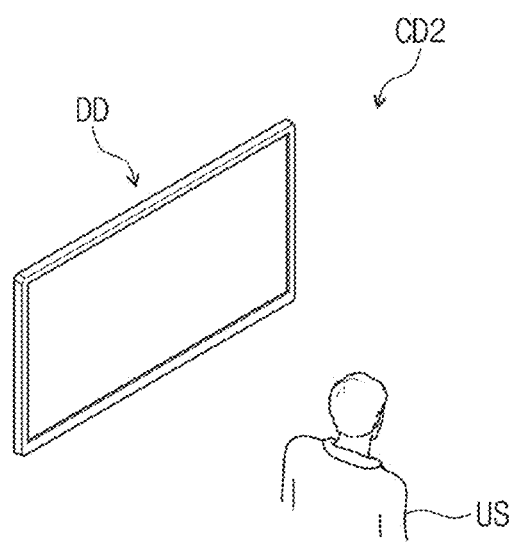
Figure 11C:
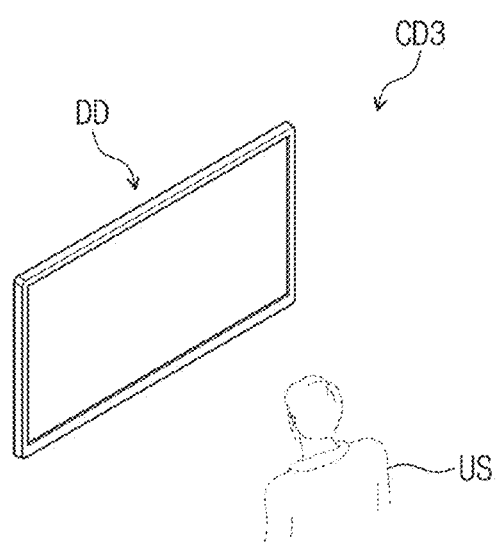
Figure 12:
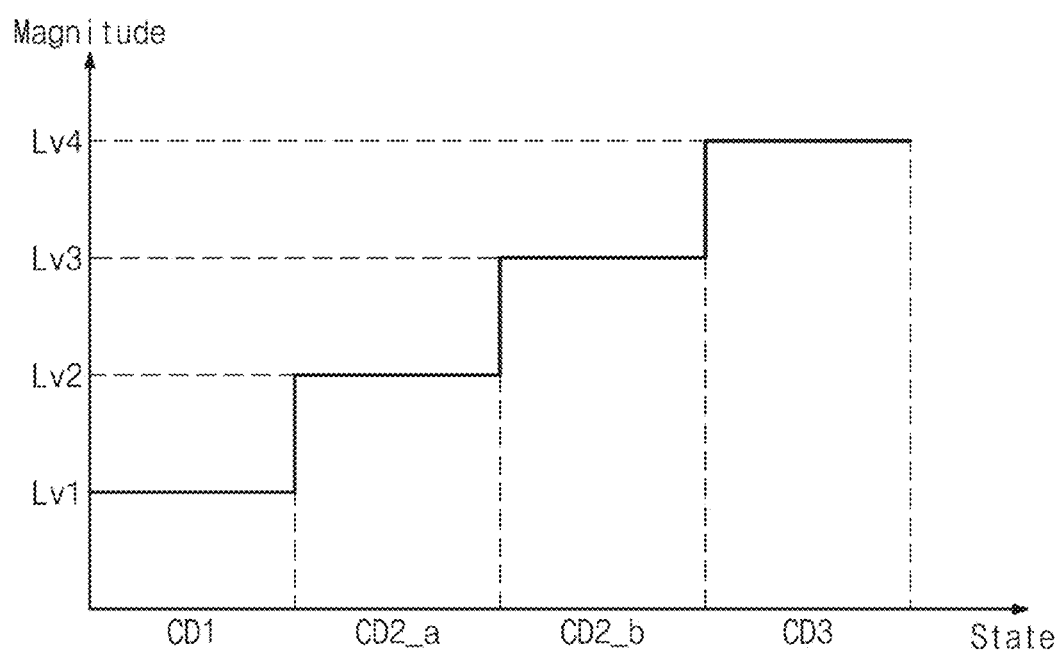
FIG. 12 is a graph for describing a state signal according to a state of a user, according to an embodiment of the disclosure.
Figure 13A:
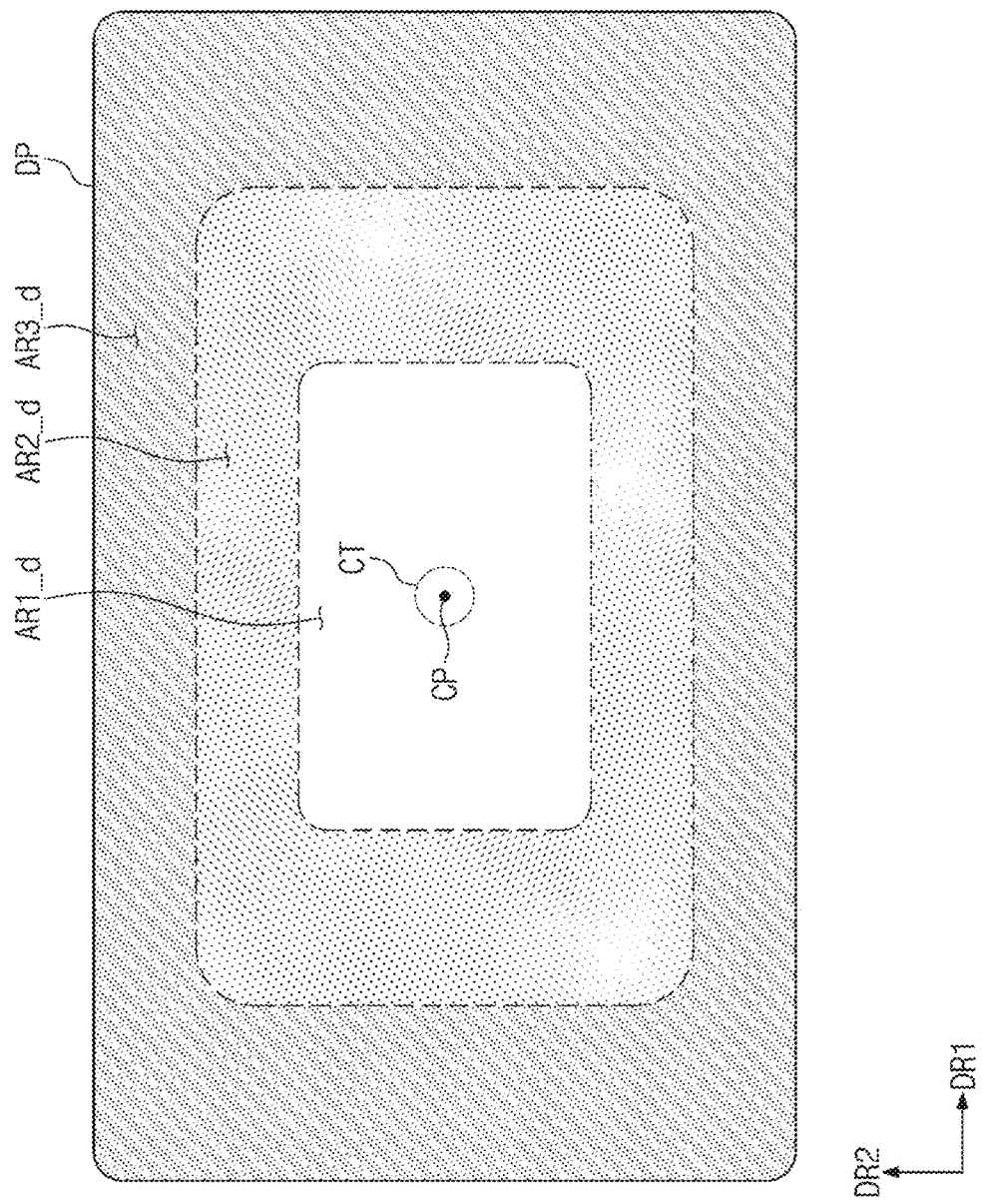
FIGS. 13A and 13B are conceptual diagrams for describing how a panel driving block operates depending on a state signal, according to embodiments of the disclosure.
Figure 13B:
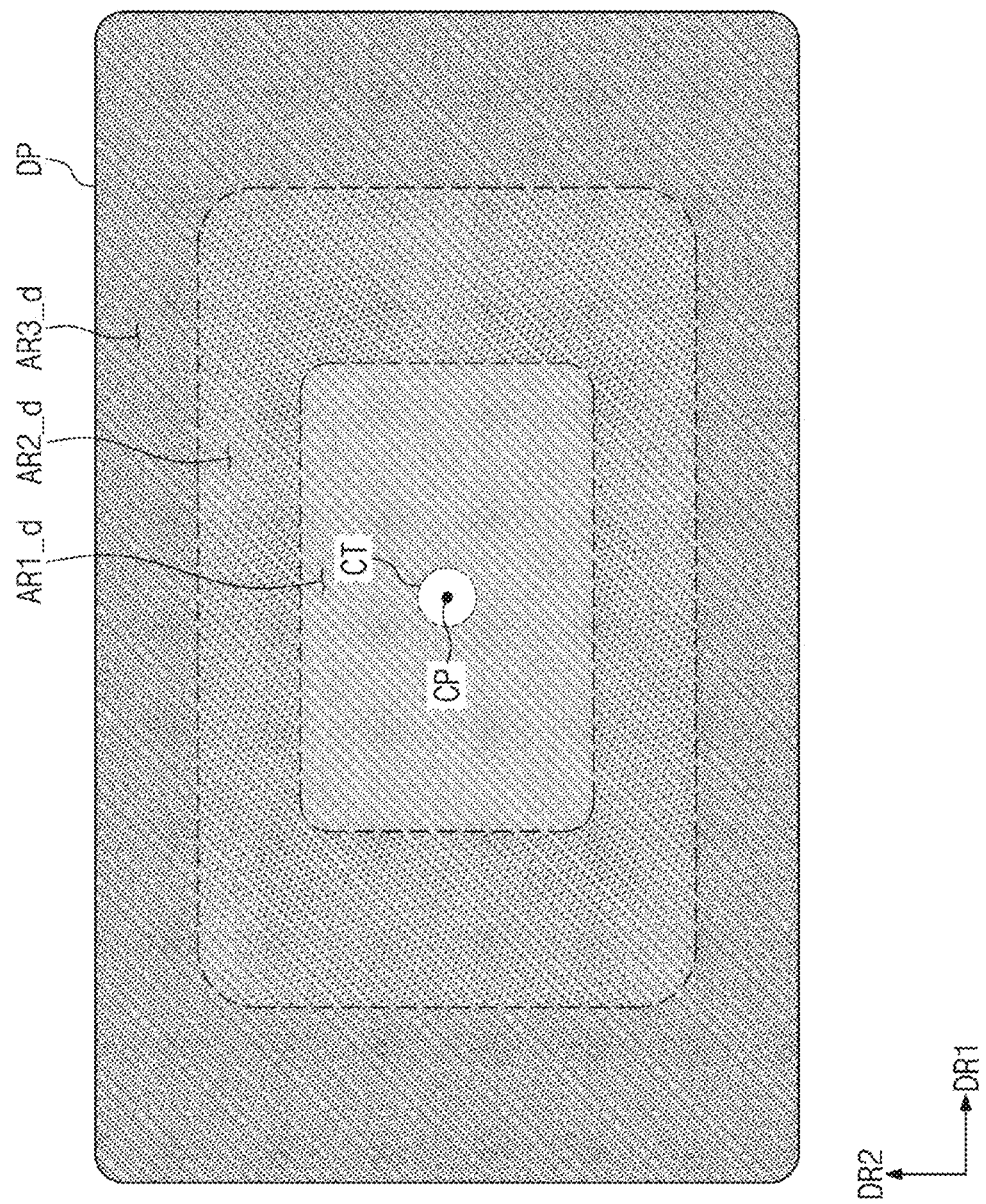

FIG. 10 is a block diagram for describing how an extracting part and a controller operate depending on a state signal, according to an embodiment of the disclosure. FIGS. 11A to 11C are conceptual diagrams for describing a state signal, according to embodiments of the disclosure. FIG. 12 is a graph for describing a magnitude of a state signal according to a state of a user, according to an embodiment of the disclosure. FIGS. 13A and 13B are conceptual diagrams for describing how a panel driving block operates depending on a state signal, according to embodiments of the disclosure.

Referring to FIG. 10, in an embodiment, a panel driving block PDB_c may include a mode determining part MDP, an extracting part EXP_c, and a controller CR_d. In FIG. 10, the same or like components as the components described above with reference to FIGS. 4A and 8B are labeled with the same or like reference numerals, and any repetitive detailed description thereof will be omitted to avoid redundancy.

In an embodiment, the panel driving block PDB_c drives the display panel DP (refer to FIG. 2) in a first mode or a second mode in response to a state signal STS. In an embodiment of the disclosure, the mode determining part MDP receives the state signal STS and the image signals RGB from the outside. The mode determining part MDP determines whether to drive the display panel DP in the first mode or in the second mode, in response to the state signal STS.

In the first mode, the panel driving block PDB_c generates image data based on the image signals RGB. A converting part CVP_d receives the image signals RGB from the mode determining part MDP and generates first image data IMD_c based on the image signals RGB. In an embodiment of the disclosure, the converting part CVP_d may receive the image signals RGB from the outside.

When the panel driving block PDB_c drives the display panel DP in the second mode, the extracting part EXP_c receives the control signal CTS from the outside. The extracting part EXP_c may extract the criterion point signal CPS based on the control signal CTS. Hereinafter, for convenience of description, a case where the panel driving block PDB_c is driven in the second mode will be described in detail.

A distance calculating part DSC_d receives the criterion point signal CPS from the extracting part EXP_c and receives the image signals RGB from the mode determining part MDP. In an embodiment of the disclosure, the distance calculating part DSC_d may receive the image signals RGB from the outside. The distance calculating part DSC_d calculates the distance information DTS between the criterion point CP (refer to FIG. 13A) and a location of the display panel DP, at which each of the image signals RGB is displayed.

A correction value calculating part CSC_d receives the setting signal SES from the outside and receives distance information DTS from the distance calculating part DSC_d. The correction value calculating part CSC_d may generate a first correction value CSV1 based on the weight WT included in the setting signal SES and the distance information DTS. In an alternative embodiment of the disclosure, the extracting part EXP_c may further extract the weight WT from the control signal CTS, and the correction value calculating part CSC_d may generate the first correction value CSV1 based on the weight WT received from the extracting part EXP_c.

A first correcting part CSP1 receive the image signals RGB from the mode determining part MDP and receives the first correction value CSV1 from the correction value calculating part CSC_d. The first correcting part CSP1 converts the image signals RGB based on the first correction value CSV1 and thus generates first correction image signals RGB1. In an embodiment of the disclosure, the panel driving block PDB_c may drive the display panel DP based on the first correction image signals RGB1. In an embodiment of the disclosure, a grayscale corresponding to the first correction image signals RGB1 may be smaller than a grayscale corresponding to the image signals RGB. In an embodiment of the disclosure, the first correcting part CSP1 may receive the image signals RGB from the outside.

A second correcting part CSP2 receives the first correction image signals RGB1 from the first correcting part CSP1 and receives a second correction value CSV2 from the outside. In an embodiment of the disclosure, the second correction value CSV2 may be a correction value that decreases a grayscale of the image IM to be displayed at the display panel DP, regardless of a distance from the second criterion point CP2. The second correcting part CSP2 converts the first correction image signals RGB1 based on the second correction value CSV2 and thus generates second correction image signals RGB2. The panel driving block PDB_c may drive the display panel DP based on the second correction image signals RGB2. In an embodiment of the disclosure, a grayscale corresponding to the second correction image signals RGB2 may be smaller than the grayscale corresponding to the image signals RGB.

The converting part CVP_d receives the second correction image signals RGB2 from the second correcting part CSP2. The converting part CVP_d may generate second image data IMD_c' based on the second correction image signals RGB2. In an alternative embodiment of the disclosure, the converting part CVP_d may receive the first correction image signals RGB1 from the first correcting part CSP1 and may generate third image data based on the first correction image signals RGB1.

Referring to FIGS. 11A to 12, a state in which a user uses the display device DD may be classified as a first state, a second state, or a third state. A level of the state signal STS may be changed to correspond to a state in which the user uses the display device DD.

As illustrated in FIG. 11A, a state in which the user provides an external input to the display device DD may be referred to as a "first state" CD1. In an embodiment of the disclosure, an external input that the user provides to the display device DD may be an input that is provided through an external input device such as a mouse or a keyboard. Also, the external input may include various types of inputs such as a part of the user's body, a light, heat, gaze, and pressure. In an embodiment of the disclosure, in the first state CD1, the state signal STS may have a first level Lv1. When the state signal STS has the first level Lv1, the panel driving block PDB_c may drive the display panel DP in the first mode.

As illustrated in FIG. 11B, a state in which the user is in front of the display device DD or does not provide an external input to the display device DD may be referred to as a "second state" CD2. In an embodiment of the disclosure, the second state CD2 includes a state in which the user is in front of the display device DD and the gaze of the user is pointed to any other place, not the display device DD. In an embodiment of the disclosure, the second state CD2 may include a first sub-state CD2_a and a second sub-state CD2_b. The first sub-state CD2_a may be a state in which the user does not provide an external input to the display device DD during a first time. The second sub-state CD2_b may be a state in which the user does not provide an external input to the display device DD during a second time longer than the first time. In an embodiment of the disclosure, in the first sub-state CD2_a, the state signal STS may have a second level Lv2. In second sub-state CD2_b, the state signal STS may have a third level Lv3. In an embodiment of the disclosure, when the state signal STS has the second level Lv2, the panel driving block PDB_c may drive the display panel DP in the second mode and may drive the display panel DP based on the first correction image signals RGB1. In an embodiment of the disclosure, when the state signal STS has the third level Lv3, the panel driving block PDB_c may drive the display panel DP in the second mode and may drive the display panel DP based on the second correction image signals RGB2.

As illustrated in FIG. 11C, a state in which the user is not in front of the display device DD may be referred to as a "third state" CD3. In an embodiment of the disclosure, in the third state CD3, an external input is not provided to the display device DD by the user. In an embodiment of the disclosure, in the third state CD3, the state signal STS may have a fourth level Lv4. In an embodiment of the disclosure, even in a case where the user does not provide an external input to the display device DD during a longer time than the second time in the second state CD2, the state signal STS may have the fourth level Lv4. In an embodiment of the disclosure, when the state signal STS has the fourth level Lv4, the panel driving block PDB_c may drive the display panel DP such that the image IM is not displayed at the display panel DP. However, the disclosure is not limited thereto. In an alternative embodiment, for example, when the state signal STS has the fourth level Lv4, the panel driving block PDB_c may drive the display panel DP based on the second correction image signals RGB2. Alternatively, when the state signal STS has the fourth level Lv4, the panel driving block PDB_c may drive the display panel DP based on third correction image signals whose grayscale is lower than a grayscale corresponding to the second correction image signals RGB2.

FIG. 13A shows grayscales corresponding to the first correction image signals RGB1, which are illustrated at the display panel DP, and FIG. 13B shows grayscales corresponding to the second correction image signals RGB2, which are illustrated at the display panel DP.

Referring to FIGS. 10 and 13A, a criterion point CP included in the criterion point signal CPS that the extracting part EXP_c generates may be located in the central portion CT. The display panel DP may include a plurality of areas AR1_d, AR2_d, and AR3_d. The areas AR1_d, AR2_d, and AR3_d may include the first area AR1_d including the criterion point CP, the second area AR2_d surrounding the first area AR1_d, and the third area AR3_d surrounding the second area AR2_d.

For convenience of description, an embodiment in which a difference between grayscales corresponding to the first correction image signals RGB1 occurs stepwise in the first area AR1_d, the second area AR2_d, and the third area AR3_d depending on a distance from the criterion point CP is illustrated in FIG. 13A. However, the disclosure is not limited thereto. Alternatively, the difference between grayscales corresponding to the first correction image signals RGB1 may be proportional to the distance from the criterion point CP.

In an embodiment of the disclosure, the setting signal SES may include the weight WT for each of the first area AR1_d, the second area AR2_d, and the third area AR3_d.

The first correction image signals RGB1 may include a first sub-image signal corresponding to the first area AR1_d, a second sub-image signal corresponding to the second area AR2_d, and a third sub-image signal corresponding to the third area AR3_d. Grayscales respectively corresponding to the first to third sub-image signals may be different from each other. In an embodiment of the disclosure, the grayscale corresponding to the first sub-image signal may be greater than the grayscale corresponding to the second sub-image signal. The grayscale corresponding to the second sub-image signal may be greater than the grayscale corresponding to the third sub-image signal.

Accordingly, a change in a grayscale of an image that is displayed in the first area AR1_d including the criterion point CP on which the gaze of the user is pointed may be controlled to be smaller than a change in a grayscale of an image that is displayed in the second area AR2_d and the third area AR3_d. A change in a grayscale of an image that is displayed in the third area AR3_d being the most distant from the criterion point CP may be controlled to be greater than a change in a grayscale of an image that is displayed in the first area AR1_d and the second area AR2_d. According to an embodiment, as described above, power consumption of the display device DD may be reduced while minimizing that the degradation of an image quality due to a change in a grayscale of the image IM (refer to FIG. 1) displayed at the display panel DP is viewable to the user.

For convenience of description, an embodiment in which a difference between grayscales corresponding to the second correction image signals RGB2 occurs stepwise in the first area AR1_d, the second area AR2_d, and the third area AR3_d depending on a distance from the criterion point CP is illustrated in FIG. 13B. However, the disclosure is not limited thereto. Alternatively, the difference between grayscales corresponding to the second correction image signals RGB2 may be proportional to the distance from the criterion point CP.

In an embodiment of the disclosure, the second correction value CSV2 may be a correction value that decreases a grayscale of an image to be displayed in the first to third areas AR1_d, AR2_d, and AR3_d.

The second correction image signals RGB2 may include a fourth sub-image signal corresponding to the first area AR1_d, a fifth sub-image signal corresponding to the second area AR2_d, and a sixth sub-image signal corresponding to the third area AR3_d. Grayscales respectively corresponding to the fourth to sixth sub-image signals may be different from each other. In an embodiment of the disclosure, the grayscale corresponding to the fourth sub-image signal may be greater than the grayscale corresponding to the fifth sub-image signal. The grayscale corresponding to the fifth sub-image signal may be greater than the grayscale corresponding to the sixth sub-image signal.

In such an embodiment, the grayscale corresponding to the fourth sub-image signal may be smaller than the grayscale corresponding to the first sub-image signal. The grayscale corresponding to the fifth sub-image signal may be smaller than the grayscale corresponding to the second sub-image signal. The grayscale corresponding to the sixth sub-image signal may be smaller than the grayscale corresponding to the third sub-image signal.

It may be possible to further reduce power consumption of the display panel DP by making the overall grayscales of the image IM displayed at the display panel DP low compared to a case shown in FIG. 13A. Also, a change in a grayscale of an image that is displayed in the first area AR1_d including the criterion point CP on which the gaze of the user is pointed may be controlled to be smaller than a change in a grayscale of an image that is displayed in the second area AR2_d and the third area AR3_d, and thus it may be possible to minimize that the degradation of an image quality due to a change in a grayscale of the image IM is viewable to the user.

According to embodiments of the disclosure, power consumption of a display device may be reduced by adjusting luminance of an image to be displayed at a periphery of a display panel depending on a signal applied from an outside.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:
a display panel which displays an image; and
a panel driving block which receives a control signal and generates a criterion point signal including information about a criterion point for adjusting luminance of the image based on the control signal, wherein the criterion point is a point where a gaze of a user is most focused among the display panel when the image is displayed,
wherein the panel driving block receives image signals corresponding to the image displayed on the display panel, generates a correction value of each of the image signals based on distance information between the criterion point and a location of the display panel, at which each of the image signals is displayed, and a frequency of the gaze of the user in a direction of the location of the display panel, at which each of the image signals is displayed, with respect to the criterion point, and generates correction image signals by converting each of the image signals based on the correction value thereof, wherein the display panel displays the image corresponding to the correction image signals, and wherein the luminance of the image is adjusted based on the distance information.

2. The display device of claim 1, wherein a grayscale corresponding to the correction image signals is smaller than a grayscale corresponding to the image signals.

3. The display device of claim 1, wherein a location of the criterion point on the display panel changes based on a type of the image to be displayed at the display panel.

4. The display device of claim 1,
wherein the display panel includes a plurality of areas divided with respect to the criterion point, and
wherein the panel driving block generates a weight for each of the areas based on the control signal and generates the correction value based on the distance information and the weight.

5. The display device of claim 4,
wherein the areas includes:
a first area corresponding to a first quadrant defined by a first axis extending from the criterion point in a first reference direction and a second axis extending from the criterion point in a second reference direction;
a second area corresponding to a second quadrant defined by a third axis extending from the criterion point in a third reference direction away from the first reference direction and the second axis;
a third area corresponding to a third quadrant defined by a fourth axis extending from the criterion point in a fourth reference direction away from the second reference direction and the third axis; and
a fourth area corresponding to a fourth quadrant defined by the first axis and the fourth axis, and
wherein the weight includes:
a first weight corresponding to the first area;
a second weight corresponding to the second area;
a third weight corresponding to the third area; and
a fourth weight corresponding to the fourth area.

6. The display device of claim 5, wherein the first to fourth weights have different values from each other.

7. The display device of claim 4,
wherein the areas includes:
a first area including the criterion point; and
a second area surrounding the first area, and
wherein the weight includes:
a first weight corresponding to the first area; and
a second weight corresponding to the second area.

8. The display device of claim 7, wherein the first weight and the second weight have different values from each other.

9. The display device of claim 1, wherein the panel driving block includes:
a controller which generates the correction image signals by converting the image signals based on the correction value and generates image data based on the correction image signals; and
a source driver which generates a data signal based on the image data and transmits the data signal to the display panel.

10. The display device of claim 9, wherein the panel driving block further includes:
an extracting part which generates the criterion point signal based on the control signal.

11. The display device of claim 10, wherein the controller includes:
a distance calculating part which extracts the distance information for each of the image signals;
a correction value calculating part which generates the correction value based on the distance information; and
a correcting part which generates the correction image signals by converting the image signals based on the correction value.

12. The display device of claim 11,
wherein the display panel includes a plurality of areas divided with respect to the criterion point, and
wherein the extracting part further generates a weight for each of the areas based on the control signal.

13. The display device of claim 12, wherein the correction value calculating part generates the correction value based on the distance information and the weight.

14. The display device of claim 9, wherein the controller includes:
an extracting part which generates the criterion point signal based on the control signal.

15. The display device of claim 14,
wherein the display panel includes a plurality of areas divided with respect to the criterion point, and
wherein the extracting part further generates a weight for each of the areas based on the control signal.

16. The display device of claim 1,
wherein the display panel includes a plurality of areas divided with respect to the criterion point, and
wherein the panel driving block further receives a setting signal including a weight for each of the areas, and generates the correction value based on the distance information and the weight.

17. The display device of claim 16, wherein a magnitude of the weight is determined by an external input.

18. The display device of claim 17,
wherein a settings application capable of adjusting the magnitude of the weight is displayed at the display panel, and
wherein the magnitude of the weight is determined by the external input selecting the magnitude of the weight in the settings application.

19. A display device comprising:
a display panel which displays an image; and
a panel driving block which receives image signals corresponding to the image displayed on the display panel, and calculates, for each of the image signals, distance information between a criterion point for adjusting luminance of the image and a location of the display panel, at which each of the image signals is displayed, and a frequency of a gaze of a user in a direction of the location of the display panel, at which each of the image signals is displayed, with respect to the criterion point, wherein the criterion point is a point where the gaze of the user is most focused among the display panel when the image is displayed,
wherein the display panel includes a plurality of areas divided with respect to the criterion point,
wherein the panel driving block receives a setting signal including a weight for each of the areas, generates a correction value of each of the image signals based on the distance information, the frequency of the gaze of the user in the direction of the location of the display panel, and the setting signal, and generates correction image signals by converting each of the image signals based on the correction value thereof, wherein the display panel displays the image corresponding to the correction image signals, and wherein the luminance of the image is adjusted based on the distance information.

20. The display device of claim 19, wherein a grayscale corresponding to the correction image signals is smaller than a grayscale corresponding to the image signals.

21. The display device of claim 20, wherein a magnitude of the weight included in the setting signal is determined by an external input.

22. The display device of claim 21,
wherein a settings application capable of adjusting the magnitude of the weight is displayed at the display panel, and
wherein the magnitude of the weight is determined by the external input selecting the magnitude of the weight in the settings application.

23. The display device of claim 19, wherein the panel driving block further receives a control signal, and generates a criterion point signal including information about the criterion point based on the control signal.

24. A display device comprising:
a display panel which displays an image; and
a panel driving block which drives the display panel in a first mode or in a second mode, in response to a state signal,
wherein, in the first mode, the panel driving block drives the display panel based on image signals,
wherein, in the second mode, the panel driving block generates, for each of the image signals, a first correction value based on distance information between a criterion point for adjusting luminance of the image and a location of the display panel, at which each of the image signals is displayed, and a frequency of a gaze of a user in a direction of the location of the display panel, at which each of the image signals is displayed, with respect to the criterion point, wherein the criterion point is a point where the gaze of the user is most focused among the display panel when the image is displayed,
wherein, in the second mode, the panel driving block drives the display panel based on first correction image signals generated by converting each of the image signals based on the first correction value, and wherein, in the second mode, the luminance of the image is adjusted based on the distance information and the frequency.

25. The display device of claim 24, wherein a grayscale corresponding to the first correction image signals is smaller than a grayscale corresponding to the image signals.

26. The display device of claim 24,
wherein the state signal changes based on an external input which the user provides to the display device,
wherein the panel driving block operates in the first mode when the user provides the external input to the display device, and operates in the second mode when the user does not provide the external input to the display device.

27. The display device of claim 24, wherein, in the second mode, the panel driving block drives the display panel based on second correction image signals generated by converting the first correction image signals based on a second correction value such that a grayscale of the image to be displayed at the display panel is decreased.

28. The display device of claim 27, wherein the panel driving block drives the display panel based on the first correction image signals when the user does not provide an external input to the display device during a first time, and drives the display panel based on the second correction image signals when the user does not provide the external input to the display device during a second time longer than the first time.

29. The display device of claim 24, wherein the panel driving block receives a control signal and generates a criterion point signal including information about the criterion point based on the control signal.

30. The display device of claim 29,
wherein the display panel includes a plurality of areas divided with respect to the criterion point, and
wherein the panel driving block generates a weight for each of the areas based on the control signal, and generates the first correction value based on the distance information, the direction of the location of the display panel, at which each of the image signals is displayed, with respect to the criterion point, and the weight.

31. The display device of claim 29,
wherein the display panel includes a plurality of areas divided with respect to the criterion point, and
wherein the panel driving block further receives a setting signal including a weight for each of the areas, and generates the first correction value based on the distance information and the weight.

* * * * *